US008577510B2

(12) United States Patent
Powell et al.

(10) Patent No.: US 8,577,510 B2
(45) Date of Patent: *Nov. 5, 2013

(54) VOLTAGE CONSERVATION USING ADVANCED METERING INFRASTRUCTURE AND SUBSTATION CENTRALIZED VOLTAGE CONTROL

(75) Inventors: Phillip W. Powell, Richmond, VA (US); Steven K. Parker, Glen Allen, VA (US); Melissa A. Bollbach, Richmond, VA (US); Mark L. Pruett, Glen Allen, VA (US)

(73) Assignees: Dominion Resources, Inc., Richmond, VA (US); Virginia Electric and Power Company, Richmond, VA (US)

(*) Notice: Subject to any disclaimer, the term of this patent is extended or adjusted under 35 U.S.C. 154(b) by 182 days.

This patent is subject to a terminal disclaimer.

(21) Appl. No.: 12/774,507

(22) Filed: May 5, 2010

(65) Prior Publication Data
US 2010/0286840 A1 Nov. 11, 2010

Related U.S. Application Data

(60) Provisional application No. 61/176,398, filed on May 7, 2009.

(51) Int. Cl.
*G06F 19/00* (2011.01)
(52) U.S. Cl.
USPC ........... 700/295; 323/257; 700/286; 700/292; 700/291; 290/44; 702/58
(58) Field of Classification Search
USPC ................... 700/295, 286, 291, 292; 290/44; 323/257; 702/58
See application file for complete search history.

(56) References Cited

U.S. PATENT DOCUMENTS

| | | | |
|---|---|---|---|
| 3,900,842 A | 8/1975 | Calabro et al. | |
| 3,970,898 A | 7/1976 | Baumann et al. | |
| 4,054,830 A | 10/1977 | Harrel | |
| 4,234,904 A | 11/1980 | Fahlesson | |
| 4,291,377 A | 9/1981 | Schneider et al. | |
| 4,302,750 A * | 11/1981 | Wadhwani et al. | 340/870.02 |

(Continued)

FOREIGN PATENT DOCUMENTS

| | | |
|---|---|---|
| EA | 9685 | 2/2008 |
| EP | 0 020 310 A1 | 12/1980 |

(Continued)

OTHER PUBLICATIONS

International Search Report and Written Opinion of the International Searching Authority mailed Dec. 20, 2010 on related PCT application PCT/US2010/033571.

(Continued)

*Primary Examiner* — Tejal Gami
(74) *Attorney, Agent, or Firm* — Dickstein Shapiro LLP

(57) ABSTRACT

A voltage control and conservation (VCC) system is provided, which includes three subsystems, including an energy delivery (ED) system, an energy control (EC) system and an energy regulation (ER) system. The VCC system is configured to monitor energy usage at the ED system and determine one or more energy delivery parameters at the EC system. The EC system may then provide the one or more energy delivery parameters to the ER system to adjust the energy delivered to a plurality of users for maximum energy conservation.

34 Claims, 17 Drawing Sheets

(56) References Cited

U.S. PATENT DOCUMENTS

| | | | |
|---|---|---|---|
| 4,307,380 | A | 12/1981 | Gander |
| 4,309,655 | A | 1/1982 | Lienhard et al. |
| 4,310,829 | A | 1/1982 | Rey |
| 4,356,553 | A | 10/1982 | Steinle et al. |
| 4,361,872 | A | 11/1982 | Spalti |
| 4,365,302 | A | 12/1982 | Elms |
| 4,434,400 | A | 2/1984 | Halder |
| 4,513,273 | A | 4/1985 | Friedl |
| 4,525,668 | A | 6/1985 | Lienhard et al. |
| 4,540,931 | A | 9/1985 | Hahn |
| 4,630,220 | A | 12/1986 | Peckinpaugh |
| 4,686,630 | A | 8/1987 | Marsland et al. |
| 4,689,752 | A | 8/1987 | Fernandes et al. |
| 4,695,737 | A | 9/1987 | Rabon et al. |
| 4,791,520 | A | 12/1988 | Stegmuller |
| 4,843,310 | A | 6/1989 | Friedl |
| 4,853,620 | A | 8/1989 | Halder et al. |
| 4,881,027 | A | 11/1989 | Joder et al. |
| 4,887,028 | A | 12/1989 | Voisine et al. |
| 4,894,610 | A | 1/1990 | Friedl |
| 4,896,106 | A | 1/1990 | Voisine et al. |
| 5,028,862 | A | 7/1991 | Roth |
| 5,032,785 | A | 7/1991 | Mathis et al. |
| 5,055,766 | A | 10/1991 | McDermott et al. |
| 5,066,906 | A | 11/1991 | Moore |
| 5,124,624 | A | 6/1992 | De Vries et al. |
| 5,128,855 | A | 7/1992 | Hilber et al. |
| 5,136,233 | A | 8/1992 | Klinkenberg et al. |
| 5,231,347 | A | 7/1993 | Voisine et al. |
| 5,249,150 | A | 9/1993 | Gruber et al. |
| 5,262,715 | A | 11/1993 | King et al. |
| 5,270,639 | A | 12/1993 | Moore |
| 5,272,462 | A | 12/1993 | Teyssandier et al. |
| 5,298,857 | A | 3/1994 | Voisine et al. |
| 5,343,143 | A | 8/1994 | Voisine et al. |
| 5,432,507 | A | 7/1995 | Mussino et al. |
| 5,466,973 | A | 11/1995 | Griffioen |
| 5,475,867 | A | 12/1995 | Blum |
| 5,511,108 | A | 4/1996 | Severt et al. |
| 5,552,696 | A | 9/1996 | Trainor et al. |
| 5,602,750 | A | 2/1997 | Severt et al. |
| 5,604,414 | A | 2/1997 | Milligan et al. |
| 5,610,394 | A | 3/1997 | Lee |
| 5,627,759 | A | 5/1997 | Bearden et al. |
| 5,646,512 | A * | 7/1997 | Beckwith .................. 323/257 |
| 5,673,252 | A | 9/1997 | Johnson et al. |
| 5,736,848 | A | 4/1998 | De Vries et al. |
| 5,903,548 | A | 5/1999 | Delamater |
| 5,918,380 | A | 7/1999 | Schleich et al. |
| 5,963,146 | A | 10/1999 | Johnson et al. |
| 6,006,212 | A | 12/1999 | Schleich et al. |
| 6,026,355 | A | 2/2000 | Rahman et al. |
| 6,172,616 | B1 | 1/2001 | Johnson et al. |
| 6,218,995 | B1 | 4/2001 | Higgins et al. |
| 6,219,655 | B1 | 4/2001 | Schleich et al. |
| 6,333,975 | B1 | 12/2001 | Brunn et al. |
| 6,373,236 | B1 | 4/2002 | Lemay, Jr. et al. |
| 6,373,399 | B1 | 4/2002 | Johnson et al. |
| 6,417,729 | B1 | 7/2002 | Lemay et al. |
| 6,555,997 | B1 | 4/2003 | De Vries et al. |
| 6,590,376 | B1 | 7/2003 | Bammert et al. |
| 6,618,684 | B1 | 9/2003 | Beroset et al. |
| 6,628,207 | B1 | 9/2003 | Hemminger et al. |
| 6,633,823 | B2 | 10/2003 | Bartone et al. |
| 6,636,893 | B1 | 10/2003 | Fong |
| 6,650,249 | B2 | 11/2003 | Meyer et al. |
| 6,653,945 | B2 | 11/2003 | Johnson et al. |
| 6,667,692 | B2 | 12/2003 | Griffin |
| 6,684,245 | B1 | 1/2004 | Shuey et al. |
| 6,700,902 | B1 | 3/2004 | Meyer |
| 6,703,823 | B1 | 3/2004 | Hemminger et al. |
| 6,738,693 | B2 | 5/2004 | Anderson |
| 6,747,446 | B1 | 6/2004 | Voisine et al. |
| 6,747,981 | B2 | 6/2004 | Ardalan et al. |
| 6,756,914 | B1 | 6/2004 | Fitzgerald et al. |
| 6,757,628 | B1 | 6/2004 | Anderson et al. |
| 6,762,598 | B1 | 7/2004 | Hemminger et al. |
| 6,773,652 | B2 | 8/2004 | Loy et al. |
| 6,778,099 | B1 | 8/2004 | Meyer et al. |
| 6,798,353 | B2 | 9/2004 | Seal et al. |
| 6,815,942 | B2 | 11/2004 | Randall et al. |
| 6,816,538 | B2 | 11/2004 | Shuey et al. |
| 6,832,135 | B2 | 12/2004 | Ying |
| 6,832,169 | B2 | 12/2004 | Wakida et al. |
| 6,838,867 | B2 | 1/2005 | Loy |
| 6,847,201 | B2 | 1/2005 | De Vries et al. |
| 6,859,186 | B2 | 2/2005 | Lizalek et al. |
| 6,859,742 | B2 | 2/2005 | Randall et al. |
| 6,867,707 | B1 | 3/2005 | Kelley et al. |
| 6,868,293 | B1 | 3/2005 | Schurr et al. |
| 6,873,144 | B2 | 3/2005 | Slater et al. |
| 6,882,137 | B1 | 4/2005 | Voisine |
| 6,885,185 | B1 | 4/2005 | Makinson et al. |
| 6,888,876 | B1 | 5/2005 | Mason et al. |
| 6,892,144 | B2 | 5/2005 | Slater et al. |
| 6,900,737 | B2 | 5/2005 | Ardalan et al. |
| 6,906,507 | B2 | 6/2005 | Briese et al. |
| 6,906,637 | B2 | 6/2005 | Martin |
| 6,940,268 | B2 | 9/2005 | Hemminger et al. |
| 6,940,711 | B2 | 9/2005 | Heuell et al. |
| 6,947,854 | B2 | 9/2005 | Swarztrauber et al. |
| 6,954,061 | B2 | 10/2005 | Hemminger et al. |
| 6,982,390 | B2 | 1/2006 | Heuell et al. |
| 6,988,043 | B1 | 1/2006 | Randall |
| 6,989,667 | B2 | 1/2006 | Loy |
| 6,995,685 | B2 | 2/2006 | Randall |
| 7,005,844 | B2 | 2/2006 | De Vries et al. |
| 7,009,379 | B2 | 3/2006 | Ramirez |
| 7,020,178 | B2 | 3/2006 | Mason et al. |
| 7,043,381 | B2 | 5/2006 | Wakida et al. |
| 7,046,682 | B2 | 5/2006 | Carpenter et al. |
| 7,064,679 | B2 | 6/2006 | Ehrke et al. |
| 7,075,288 | B2 | 7/2006 | Martin et al. |
| 7,079,962 | B2 | 7/2006 | Cornwall et al. |
| 7,084,783 | B1 | 8/2006 | Melvin et al. |
| 7,089,125 | B2 | 8/2006 | Sonderegger |
| 7,091,878 | B2 | 8/2006 | Holle et al. |
| 7,109,882 | B2 | 9/2006 | Angelis |
| 7,112,949 | B2 | 9/2006 | Voisine |
| 7,116,243 | B2 | 10/2006 | Schleich et al. |
| 7,119,698 | B2 | 10/2006 | Schleich et al. |
| 7,119,713 | B2 | 10/2006 | Shuey et al. |
| 7,126,493 | B2 | 10/2006 | Junker |
| 7,126,494 | B2 | 10/2006 | Ardalan et al. |
| 7,135,850 | B2 | 11/2006 | Ramirez |
| 7,142,106 | B2 | 11/2006 | Scoggins |
| 7,145,474 | B2 | 12/2006 | Shuey et al. |
| 7,149,605 | B2 | 12/2006 | Chassin et al. |
| 7,154,938 | B2 | 12/2006 | Cumeralto et al. |
| 7,161,455 | B2 | 1/2007 | Tate et al. |
| 7,167,804 | B2 | 1/2007 | Fridholm et al. |
| 7,168,972 | B1 | 1/2007 | Autry et al. |
| 7,170,425 | B2 | 1/2007 | Christopher et al. |
| 7,176,807 | B2 | 2/2007 | Scoggins et al. |
| 7,180,282 | B2 | 2/2007 | Schleifer |
| 7,187,906 | B2 | 3/2007 | Mason et al. |
| 7,196,673 | B2 | 3/2007 | Savage et al. |
| 7,209,049 | B2 | 4/2007 | Dusenberry et al. |
| 7,218,998 | B1 | 5/2007 | Neale |
| 7,224,158 | B2 | 5/2007 | Petr |
| 7,227,350 | B2 | 6/2007 | Shuey |
| 7,230,972 | B2 | 6/2007 | Cornwall et al. |
| 7,236,498 | B1 | 6/2007 | Moos et al. |
| 7,236,908 | B2 | 6/2007 | Timko et al. |
| 7,239,125 | B2 | 7/2007 | Hemminger et al. |
| 7,239,250 | B2 | 7/2007 | Brian et al. |
| 7,245,511 | B2 | 7/2007 | Lancaster et al. |
| 7,262,709 | B2 | 8/2007 | Borleske et al. |
| 7,274,187 | B2 | 9/2007 | Loy |
| 7,277,027 | B2 | 10/2007 | Ehrke et al. |
| 7,283,062 | B2 | 10/2007 | Hoiness et al. |
| 7,283,580 | B2 | 10/2007 | Cumeralto et al. |
| 7,283,916 | B2 | 10/2007 | Cahill-O'Brien et al. |
| 7,298,134 | B2 | 11/2007 | Weikel et al. |

(56) References Cited

U.S. PATENT DOCUMENTS

| | | |
|---|---|---|
| 7,298,135 B2 | 11/2007 | Briese et al. |
| 7,301,476 B2 | 11/2007 | Shuey et al. |
| 7,308,369 B2 | 12/2007 | Rudran et al. |
| 7,308,370 B2 | 12/2007 | Mason et al. |
| 7,312,721 B2 | 12/2007 | Mason et al. |
| 7,315,162 B2 | 1/2008 | Shuey |
| 7,317,404 B2 | 1/2008 | Cumeralto et al. |
| 7,327,998 B2 | 2/2008 | Kumar et al. |
| 7,336,200 B2 | 2/2008 | Osterloh et al. |
| 7,339,805 B2 | 3/2008 | Hemminger et al. |
| 7,346,030 B2 | 3/2008 | Cornwall |
| 7,348,769 B2 | 3/2008 | Ide et al. |
| 7,355,867 B2 | 4/2008 | Shuey |
| 7,362,232 B2 | 4/2008 | Holle et al. |
| 7,362,236 B2 | 4/2008 | Hoiness |
| 7,365,687 B2 | 4/2008 | Borleske et al. |
| 7,417,420 B2 | 8/2008 | Shuey |
| 7,417,557 B2 | 8/2008 | Osterloh et al. |
| 7,421,205 B2 | 9/2008 | Ramirez |
| 7,427,927 B2 | 9/2008 | Borleske et al. |
| 7,453,373 B2 | 11/2008 | Cumeralto et al. |
| 7,471,516 B2 | 12/2008 | Voisine |
| 7,479,895 B2 | 1/2009 | Osterloh et al. |
| 7,486,056 B2 | 2/2009 | Shuey |
| 7,495,578 B2 | 2/2009 | Borleske |
| 7,504,821 B2 | 3/2009 | Shuey |
| 7,505,453 B2 | 3/2009 | Carpenter et al. |
| 7,510,422 B2 | 3/2009 | Showcatally et al. |
| 7,516,026 B2 | 4/2009 | Cornwall et al. |
| 7,535,378 B2 | 5/2009 | Cornwall |
| 7,540,766 B2 | 6/2009 | Makinson et al. |
| 7,545,135 B2 | 6/2009 | Holle et al. |
| 7,545,285 B2 | 6/2009 | Shuey et al. |
| 7,561,062 B2 | 7/2009 | Schleich et al. |
| 7,561,399 B2 | 7/2009 | Slater et al. |
| 7,583,203 B2 | 9/2009 | Uy et al. |
| 7,584,066 B2 | 9/2009 | Roytelman |
| 7,616,420 B2 | 11/2009 | Slater et al. |
| 7,626,489 B2 | 12/2009 | Berkman et al. |
| 7,630,863 B2 | 12/2009 | Zweigle et al. |
| 7,639,000 B2 | 12/2009 | Briese et al. |
| 7,656,649 B2 | 2/2010 | Loy et al. |
| 7,671,814 B2 | 3/2010 | Savage et al. |
| 7,683,642 B2 | 3/2010 | Martin et al. |
| 7,688,060 B2 | 3/2010 | Briese et al. |
| 7,688,061 B2 | 3/2010 | Briese et al. |
| 7,696,941 B2 | 4/2010 | Cunningham, Jr. |
| 7,701,199 B2 | 4/2010 | Makinson et al. |
| 7,702,594 B2 | 4/2010 | Scoggins et al. |
| 7,729,852 B2 | 6/2010 | Hoiness et al. |
| 7,742,430 B2 | 6/2010 | Scoggins et al. |
| 7,746,054 B2 | 6/2010 | Shuey |
| 7,747,400 B2 | 6/2010 | Voisine |
| 7,747,534 B2 | 6/2010 | Villicana et al. |
| 7,756,030 B2 | 7/2010 | Clave et al. |
| 7,756,078 B2 | 7/2010 | Wyk et al. |
| 7,756,651 B2 | 7/2010 | Holdsclaw |
| 7,761,249 B2 | 7/2010 | Ramirez |
| 7,764,714 B2 | 7/2010 | Monier et al. |
| 2002/0109607 A1 | 8/2002 | Cumeralto et al. |
| 2002/0158774 A1 | 10/2002 | Johnson et al. |
| 2003/0001754 A1 | 1/2003 | Johnson et al. |
| 2003/0122686 A1 | 7/2003 | Ehrke et al. |
| 2003/0187550 A1* | 10/2003 | Wilson et al. ............... 700/295 |
| 2004/0061625 A1 | 4/2004 | Ehrke et al. |
| 2004/0066310 A1 | 4/2004 | Ehrke et al. |
| 2004/0070517 A1 | 4/2004 | Ehrke et al. |
| 2004/0119458 A1 | 6/2004 | Heuell et al. |
| 2004/0150575 A1 | 8/2004 | Lizalek et al. |
| 2004/0192415 A1 | 9/2004 | Luglio et al. |
| 2004/0218616 A1 | 11/2004 | Ardalan et al. |
| 2004/0222783 A1 | 11/2004 | Loy |
| 2005/0024235 A1 | 2/2005 | Shuey et al. |
| 2005/0090995 A1 | 4/2005 | Sonderegger |
| 2005/0110480 A1 | 5/2005 | Martin et al. |
| 2005/0119841 A1 | 6/2005 | Martin |
| 2005/0119930 A1 | 6/2005 | Simon |
| 2005/0212689 A1 | 9/2005 | Randall |
| 2005/0218873 A1 | 10/2005 | Shuey et al. |
| 2005/0237047 A1 | 10/2005 | Voisine |
| 2005/0240314 A1 | 10/2005 | Martinez |
| 2005/0251401 A1 | 11/2005 | Shuey |
| 2005/0251403 A1 | 11/2005 | Shuey |
| 2005/0270015 A1 | 12/2005 | Hemminger et al. |
| 2005/0278440 A1 | 12/2005 | Scoggins |
| 2006/0001415 A1 | 1/2006 | Fridholm et al. |
| 2006/0012935 A1 | 1/2006 | Murphy |
| 2006/0038548 A1 | 2/2006 | Shuey |
| 2006/0043961 A1 | 3/2006 | Loy |
| 2006/0044157 A1 | 3/2006 | Peters et al. |
| 2006/0044851 A1 | 3/2006 | Lancaster et al. |
| 2006/0055610 A1 | 3/2006 | Borisov et al. |
| 2006/0056493 A1 | 3/2006 | Cornwall et al. |
| 2006/0071810 A1 | 4/2006 | Scoggins et al. |
| 2006/0071812 A1 | 4/2006 | Mason et al. |
| 2006/0074556 A1 | 4/2006 | Hoiness et al. |
| 2006/0074601 A1 | 4/2006 | Hoiness et al. |
| 2006/0085147 A1 | 4/2006 | Cornwall et al. |
| 2006/0114121 A1 | 6/2006 | Cumeralto et al. |
| 2006/0126255 A1 | 6/2006 | Slater et al. |
| 2006/0145685 A1 | 7/2006 | Ramirez |
| 2006/0145890 A1 | 7/2006 | Junker et al. |
| 2006/0158177 A1 | 7/2006 | Ramirez |
| 2006/0158348 A1 | 7/2006 | Ramirez |
| 2006/0168804 A1 | 8/2006 | Loy et al. |
| 2006/0202858 A1 | 9/2006 | Holle et al. |
| 2006/0206433 A1 | 9/2006 | Scoggins |
| 2006/0217936 A1 | 9/2006 | Mason et al. |
| 2006/0224335 A1 | 10/2006 | Borleske et al. |
| 2006/0232433 A1 | 10/2006 | Holle et al. |
| 2006/0261973 A1 | 11/2006 | Junker et al. |
| 2007/0013549 A1 | 1/2007 | Schleich et al. |
| 2007/0063868 A1 | 3/2007 | Borleske |
| 2007/0073866 A1 | 3/2007 | Rudran et al. |
| 2007/0091548 A1 | 4/2007 | Voisine |
| 2007/0096769 A1 | 5/2007 | Shuey |
| 2007/0115022 A1 | 5/2007 | Hemminger et al. |
| 2007/0124109 A1 | 5/2007 | Timko et al. |
| 2007/0124262 A1 | 5/2007 | Uy et al. |
| 2007/0147268 A1 | 6/2007 | Kelley et al. |
| 2007/0177319 A1 | 8/2007 | Hirst |
| 2007/0200729 A1 | 8/2007 | Borleske et al. |
| 2007/0213880 A1 | 9/2007 | Ehlers |
| 2007/0222421 A1 | 9/2007 | Labuschagne |
| 2007/0229305 A1 | 10/2007 | Bonicatto et al. |
| 2007/0236362 A1 | 10/2007 | Brian et al. |
| 2007/0257813 A1 | 11/2007 | Vaswani et al. |
| 2007/0262768 A1 | 11/2007 | Holdsclaw |
| 2007/0271006 A1 | 11/2007 | Golden et al. |
| 2008/0001779 A1 | 1/2008 | Cahill-O'Brien et al. |
| 2008/0007247 A1 | 1/2008 | Gervals et al. |
| 2008/0007426 A1 | 1/2008 | Morand |
| 2008/0010212 A1 | 1/2008 | Moore et al. |
| 2008/0012550 A1 | 1/2008 | Shuey |
| 2008/0018492 A1 | 1/2008 | Ehrke et al. |
| 2008/0024115 A1 | 1/2008 | Makinson et al. |
| 2008/0062055 A1 | 3/2008 | Cunningham |
| 2008/0068004 A1 | 3/2008 | Briese et al. |
| 2008/0068005 A1 | 3/2008 | Briese et al. |
| 2008/0068006 A1 | 3/2008 | Briese et al. |
| 2008/0079741 A1 | 4/2008 | Martin et al. |
| 2008/0088475 A1 | 4/2008 | Martin |
| 2008/0097707 A1 | 4/2008 | Voisine |
| 2008/0111526 A1 | 5/2008 | Shuey |
| 2008/0116906 A1 | 5/2008 | Martin et al. |
| 2008/0129420 A1 | 6/2008 | Borisov et al. |
| 2008/0129537 A1 | 6/2008 | Osterloh et al. |
| 2008/0143491 A1 | 6/2008 | Deaver |
| 2008/0144548 A1 | 6/2008 | Shuey et al. |
| 2008/0180274 A1 | 7/2008 | Cumeralto et al. |
| 2008/0204272 A1 | 8/2008 | Ehrke et al. |
| 2008/0204953 A1 | 8/2008 | Shuey |
| 2008/0218164 A1 | 9/2008 | Sanderford |
| 2008/0219210 A1 | 9/2008 | Shuey et al. |

(56) References Cited

U.S. PATENT DOCUMENTS

| | | |
|---|---|---|
| 2008/0224891 A1 | 9/2008 | Ehrke et al. |
| 2008/0238714 A1 | 10/2008 | Ehrke et al. |
| 2008/0238716 A1 | 10/2008 | Ehrke et al. |
| 2008/0266133 A1 | 10/2008 | Martin |
| 2009/0003214 A1 | 1/2009 | Vaswani et al. |
| 2009/0003232 A1 | 1/2009 | Vaswani et al. |
| 2009/0003243 A1 | 1/2009 | Vaswani et al. |
| 2009/0003356 A1 | 1/2009 | Vaswani et al. |
| 2009/0015234 A1 | 1/2009 | Voisine et al. |
| 2009/0062970 A1 | 3/2009 | Forbes, Jr. et al. |
| 2009/0096211 A1* | 4/2009 | Stiesdal ............... 290/44 |
| 2009/0134996 A1 | 5/2009 | White, II et al. |
| 2009/0146839 A1 | 6/2009 | Reddy et al. |
| 2009/0153356 A1 | 6/2009 | Holt |
| 2009/0167558 A1 | 7/2009 | Borleske |
| 2009/0187284 A1* | 7/2009 | Kreiss et al. ............. 700/291 |
| 2009/0224940 A1 | 9/2009 | Cornwall |
| 2009/0245270 A1 | 10/2009 | Van Greunen et al. |
| 2009/0256364 A1 | 10/2009 | Gadau et al. |
| 2009/0262642 A1 | 10/2009 | Van Greunen et al. |
| 2009/0265042 A1 | 10/2009 | Mollenkopf |
| 2009/0276170 A1* | 11/2009 | Bickel ............... 702/58 |
| 2009/0278708 A1 | 11/2009 | Kelley |
| 2009/0281673 A1* | 11/2009 | Taft ............... 700/286 |
| 2009/0281679 A1 | 11/2009 | Taft et al. |
| 2009/0284251 A1 | 11/2009 | Makinson et al. |
| 2009/0287428 A1 | 11/2009 | Holdsclaw et al. |
| 2009/0294260 A1 | 12/2009 | Makinson et al. |
| 2009/0295371 A1 | 12/2009 | Pontin et al. |
| 2009/0296431 A1 | 12/2009 | Borisov |
| 2009/0299660 A1 | 12/2009 | Winter |
| 2009/0299884 A1 | 12/2009 | Chandra |
| 2009/0300191 A1 | 12/2009 | Pace et al. |
| 2009/0309749 A1 | 12/2009 | Gilbert et al. |
| 2009/0309756 A1 | 12/2009 | Mason et al. |
| 2009/0310511 A1 | 12/2009 | Vaswani et al. |
| 2009/0312881 A1 | 12/2009 | Venturini et al. |
| 2009/0319093 A1 | 12/2009 | Joos et al. |
| 2010/0007521 A1 | 1/2010 | Cornwall |
| 2010/0007522 A1 | 1/2010 | Morris |
| 2010/0010700 A1 | 1/2010 | Hoiness et al. |
| 2010/0013632 A1 | 1/2010 | Salewske et al. |
| 2010/0026517 A1 | 2/2010 | Cumeralto et al. |
| 2010/0036624 A1 | 2/2010 | Martin et al. |
| 2010/0036625 A1 | 2/2010 | Martin et al. |
| 2010/0040042 A1 | 2/2010 | Van Greunen et al. |
| 2010/0045479 A1 | 2/2010 | Schamber et al. |
| 2010/0060259 A1 | 3/2010 | Vaswani et al. |
| 2010/0061350 A1 | 3/2010 | Flammer, III |
| 2010/0073193 A1 | 3/2010 | Flammer, III |
| 2010/0074176 A1 | 3/2010 | Flammer, III et al. |
| 2010/0074304 A1 | 3/2010 | Flammer, III |
| 2010/0103940 A1 | 4/2010 | Van Greunen et al. |
| 2010/0109650 A1 | 5/2010 | Briese et al. |
| 2010/0110617 A1 | 5/2010 | Savage et al. |
| 2010/0117856 A1 | 5/2010 | Sonderegger |
| 2010/0128066 A1 | 5/2010 | Murata et al. |
| 2010/0134089 A1 | 6/2010 | Uram et al. |
| 2010/0150059 A1 | 6/2010 | Hughes et al. |
| 2010/0157838 A1 | 6/2010 | Vaswani et al. |
| 2010/0188254 A1 | 7/2010 | Johnson et al. |
| 2010/0188255 A1 | 7/2010 | Cornwall |
| 2010/0188256 A1 | 7/2010 | Cornwall et al. |
| 2010/0188257 A1 | 7/2010 | Johnson |
| 2010/0188258 A1 | 7/2010 | Cornwall et al. |
| 2010/0188259 A1 | 7/2010 | Johnson et al. |
| 2010/0188260 A1 | 7/2010 | Cornwall et al. |
| 2010/0188263 A1 | 7/2010 | Cornwall et al. |
| 2010/0188938 A1 | 7/2010 | Johnson et al. |
| 2010/0192001 A1 | 7/2010 | Cornwall et al. |

FOREIGN PATENT DOCUMENTS

| | | |
|---|---|---|
| JP | 2002-247780 A | 8/2002 |
| JP | 2004-096906 A | 3/2004 |
| JP | 2006-208047 A | 8/2006 |
| RU | 2066084 | 8/1996 |
| RU | 2200364 | 3/2003 |
| SU | 1473008 | 4/1989 |
| WO | WO 98/26489 | 6/1998 |
| WO | WO 2008/144860 A1 | 12/2008 |

OTHER PUBLICATIONS

International Search Report dated Dec. 20, 2011.

* cited by examiner

| DATE | TIME | MWATT | MVAR | VOLT | MVA | PF | LOAD FTR | LOSS FTR |
|---|---|---|---|---|---|---|---|---|
| 2/1/2009 | 1:00:00 | 27.43 | -0.224 | 121.039 | 27.431 | | | 1 |
| 2/1/2009 | 2:00:00 | 26.794 | -0.221 | 121.118 | 26.795 | | | 1 |
| 2/1/2009 | 3:00:00 | 26.47 | -0.236 | 121.118 | 26.471 | | | 1 |
| 2/1/2009 | 4:00:00 | 26.269 | -0.227 | 121.118 | 26.27 | | | 1 |
| 2/1/2009 | 5:00:00 | 26.353 | -0.221 | 121.118 | 26.354 | | | 1 |
| 2/1/2009 | 6:00:00 | 26.668 | -0.193 | 121.118 | 26.669 | | | 1 |
| 2/1/2009 | 7:00:00 | 27.551 | -0.137 | 120.951 | 27.551 | | | 1 |
| 2/1/2009 | 8:00:00 | 28.732 | -0.108 | 121.118 | 28.732 | | | 1 |
| 2/1/2009 | 9:00:00 | 29.551 | -0.281 | 121.235 | 29.552 | | | 0.999 |
| 2/1/2009 | 10:00:00 | 28.496 | -0.746 | 121.501 | 28.506 | | | 0.998 |
| 2/1/2009 | 11:00:00 | 27.312 | -1.148 | 121.782 | 27.336 | | | 0.998 |
| 2/1/2009 | 12:00:00 | 26.031 | -1.511 | 121.606 | 26.075 | | | 0.997 |
| 2/1/2009 | 13:00:00 | 25.222 | -1.657 | 121.397 | 25.276 | | | 0.997 |
| 2/1/2009 | 14:00:00 | 24.255 | -1.761 | 121.650 | 24.319 | | | 0.997 |
| 2/1/2009 | 15:00:00 | 23.324 | -1.868 | 121.487 | 23.4 | | | 0.996 |
| 2/1/2009 | 16:00:00 | 23.102 | -1.933 | 121.118 | 23.183 | | | 0.996 |
| 2/1/2009 | 17:00:00 | 23.606 | -1.985 | 121.118 | 23.689 | | | 0.996 |
| 2/1/2009 | 18:00:00 | 25.968 | -1.709 | 120.632 | 26.022 | | | 0.998 |
| 2/1/2009 | 19:00:00 | 25.957 | -1.774 | 120.457 | 26.018 | | | 0.997 |
| 2/1/2009 | 20:00:00 | 23.985 | -1.974 | 120.796 | 24.066 | | | 0.996 |
| 2/1/2009 | 21:00:00 | 23.362 | -2.099 | 120.676 | 23.456 | | | 0.995 |
| 2/1/2009 | 22:00:00 | 22.537 | -2.226 | 120.728 | 22.647 | | | 0.995 |
| 2/1/2009 | 23:00:00 | 21.525 | -2.323 | 120.898 | 21.65 | | | 0.994 |
| 2/1/2009 | 24:00:00 | 20.139 | -2.352 | 120.965 | 20.276 | 0.993 | 86.099 | 74.746 |
| 2/2/2009 | 1:00:00 | 18.886 | -2.392 | 121.219 | 18.838 | | | 0.992 |

Daily Summary
Month/Year: 02/2009
on: RICHMOND INTERNATIONAL AIRPORT (13740)
Lat: 37.511
Lon: -77.323
Elev: 163 ft. above sea level

| YearMonthDay | Tmax | Tmin | Tavg | DewPoint | WetBulb | Heat | Cool | StnPressure |
|---|---|---|---|---|---|---|---|---|
| 20090201 | 64 | 28 | 46 | 24 | 37 | 19 | 0 | 29.87 |
| 20090202 | 63 | 33 | 48 | 30 | 40 | 17 | 0 | 29.76 |
| 20090203 | 43 | 28 | 36 | 26 | 32 | 29 | 0 | 29.68 |
| 20090204 | 35 | 25 | 30 | 11 | 24 | 35 | 0 | 29.92 |
| 20090205 | 29 | 16 | 23 | 2 | 17 | 42 | 0 | 30.24 |
| 20090206 | 50 | 14 | 32 | 13 | 25 | 33 | 0 | 30.23 |
| 20090207 | 69 | 29 | 49 | 35 | 39 | 16 | 0 | 30.13 |
| 20090208 | 72 | 48 | 60 | 55 | 47 | 5 | 0 | 29.95 |
| 20090209 | 55 | 34 | 45 | 27 | 38 | 20 | 0 | 30.19 |
| 20090210 | 70 | 38 | 54 | 43 | 49 | 11 | 0 | 30.04 |
| 20090211 | 72 | 52 | 62 | 50 | 56 | 3 | 0 | 29.78 |
| 20090212 | 67 | 50 | 57 | 37 | 45 | 6 | 0 | 29.57 |
| 20090213 | 62 | 32 | 47 | 22 | 38 | 18 | 0 | 29.8 |
| 20090214 | 56 | 28 | 42 | 26 | 35 | 23 | 0 | 29.78 |
| 20090215 | 48 | 30 | 39 | 21 | 33 | 26 | 0 | 29.91 |
| 20090216 | 43 | 30 | 37 | 15 | 29 | 28 | 0 | 30.01 |
| 20090217 | 45 | 25 | 35 | 13 | 28 | 30 | 0 | 30.1 |
| 20090218 | 51 | 32 | 42 | 35 | 40 | 23 | 0 | 29.59 |
| 20090219 | 56 | 30 | 43 | 27 | 39 | 22 | 0 | 29.39 |
| 20090220 | 41 | 26 | 33 | 5 | 26 | 32 | 0 | 29.82 |
| 20090221 | 49 | 18 | 34 | 12 | 28 | 31 | 0 | 30.08 |
| 20090222 | 44 | 30 | 37 | 24 | 34 | 28 | 0 | 29.86 |
| 20090223 | 41 | 26 | 34 | 8 | 25 | 31 | 0 | 30.12 |
| 20090224 | 43 | 19 | 31 | 7 | 24 | 34 | 0 | 30.24 |
| 20090225 | 53 | 20 | 37 | 14 | 29 | 28 | 0 | 30.24 |
| 20090226 | 66 | 31 | 49 | 32 | 42 | 16 | 0 | 30.12 |
| 20090227 | 69 | 48 | 59 | 46 | 51 | 6 | 0 | 29.89 |

FIG. 11

VOLTAGE CONSERVATION USING ADVANCED METERING INFRASTRUCTURE AND SUBSTATION CENTRALIZED VOLTAGE CONTROL

CROSS REFERENCE TO PRIOR APPLICATIONS

This application claims priority and the benefit thereof from a U.S. Provisional Application No. 61/176,398, filed on May 7, 2009 and entitled VOLTAGE CONSERVATION USING ADVANCED METERING INFRASTRUCTURE AND SUBSTATION CENTRALIZED VOLTAGE CONTROL, the entirety of which is herein incorporated by reference.

FIELD OF THE DISCLOSURE

The present disclosure relates to a method, an apparatus, a system and a computer program for conserving energy. More particularly, the disclosure relates to a novel implementation of voltage conservation using advanced infrastructure and substation centralized voltage control.

BACKGROUND OF THE DISCLOSURE

Electricity is commonly generated at a power station by electromechanical generators, which are typically driven by heat engines fueled by chemical combustion or nuclear fission, or driven by kinetic energy flowing from water or wind. The electricity is generally supplied to end users through transmission grids as an alternating current signal. The transmission grids may include a network of power stations, transmission circuits, substations, and the like.

The generated electricity is typically stepped-up in voltage using, for example, generating step-up transformers, before supplying the electricity to a transmission system. Stepping up the voltage improves transmission efficiency by reducing the electrical current flowing in the transmission system conductors, while keeping the power transmitted nearly equal to the power input. The stepped-up voltage electricity is then transmitted through the transmission system to a distribution system, which distributes the electricity to end users. The distribution system may include a network that carries electricity from the transmission system and delivering it to end users. Typically, the network may include medium-voltage (for example, less than 69 kV) power lines, electrical substations, transformers, low-voltage (for example, less than 1 kV) distribution wiring, electric meters, and the like.

The following describe subject matter related to power generation or distribution: Power Distribution Planning Reference Book, Second Edition, H. Lee Willis, 2004; Estimating Methodology for a Large Regional Application of Conservation Voltage Reduction, J. G. De Steese, S. B. Merrick, B. W. Kennedy, IEEE Transactions on Power Systems, 1990; Implementation of Conservation Voltage Reduction at Commonwealth Edison, IEEE Transactions on Power Systems, D. Kirshner, 1990; and Conservation Voltage Reduction at Northeast Utilities, D. M. Lauria, IEEE, 1987. Further, U.S. Pat. No. 5,466,973, issued to Griffioen on Nov. 14, 1995, describes a method for regulating the voltage at which electric energy is supplied at the delivery points in a network for distributing electricity.

The disclosure provides a novel method, apparatus, system and computer program for conserving energy in electric systems. More particularly, the disclosure provides a novel solution to conserve energy by implementing voltage conservation using advanced infrastructure and substation centralized voltage control.

SUMMARY OF THE DISCLOSURE

According to an aspect of the disclosure, a voltage control and conservation (VCC) system is provided for monitoring, controlling and conserving energy. The VCC system comprises: a substation configured to supply electrical power to a plurality of user locations; a smart meter located at one of the plurality of user locations and configured to generate smart meter data based on a measured component of electrical power received by the smart meter; and a voltage controller configured to generate an energy delivery parameter based on the smart meter data, wherein the substation is further configured to adjust a voltage set point value of the electrical power supplied to the plurality of user locations based on the energy delivery parameter, and wherein the smart meter is configured to operate in a report-by-exception mode and sua sponte send the smart meter data to the voltage controller when the measured component of electrical power is determined to be outside of a target component band.

The VCC system may further comprise a second smart meter located at a second one of the plurality of user locations and configured to generate second smart meter data based on a second measured component of electrical power received by the second smart meter, wherein the voltage controller is further configured to determine an average user voltage component by averaging the measured component of electrical power received by the smart meter and the second measured component of electrical power received by the second smart meter.

The VCC system may further comprise a collector configured to receive the smart meter data from the smart meter and generate collector data, wherein the voltage controller is further configured to generate the energy delivery parameter based on the collector data.

In the VCC system, the target component band may include a target voltage band, and the voltage controller may be configured to compare the measured component of electrical power received by the smart meter to the target voltage band and adjust the voltage set point based on a result of the comparison.

The substation may comprise: a load tap change transformer that adjusts the voltage set point value based on a load tap change coefficient; or a voltage regulator that adjusts the voltage set point value based on the energy delivery parameter. The substation may comprise a distribution bus that supplies the electrical power to the plurality of user locations, wherein an electrical power supply voltage component is measured on the distribution bus.

The voltage controller may comprise: a meter automation system server (MAS); a distribution management system (DMS); and a regional operation center (ROC). The voltage controller may be configured to adjust the voltage set point at a maximum rate of one load tap change step. The voltage controller may be configured to adjust the voltage set point based on the average user voltage component. The voltage controller may be configured to maintain the measured component of electrical power received by the smart meter within the target voltage band based on the result of the comparison. The voltage controller may be configured to select said smart meter for monitoring and create a connection to said smart meter after receiving the smart meter data sent sua sponte by said smart meter while operating in the report-by-exception mode. The voltage controller may be configured to de-select another smart meter that was previously selected to be monitored. The voltage controller may be configured to create a connection to said smart meter and terminate a connection to said another smart meter. The sua sponte smart meter data received from said smart meter may be representative of a low voltage limiting level in the system. The voltage controller may be configured to: store historical component data that includes at least one of an aggregated energy component data at a substation level, a voltage component data at a substation level, and a weather data; determine energy usage at each of the plurality of user locations; compare the historical component data to the determined energy usage; and determine energy savings attributable to the system based on the results of the comparison of the historical component data to the determined energy usage. The voltage controller may be configured to determine energy savings attributable to the system based on a linear regression that removes effects of weather, load growth, or economic effects. The Voltage controller may be further configured to increase the voltage set point when either the electrical power supply voltage component or the average user voltage component falls below a target voltage band.

According to a further aspect of the disclosure, a VCC system is provided that comprises: a substation configured to supply electrical power to a plurality of user locations; a smart meter located at one of the plurality of user locations and configured to generate smart meter data based on a measured component of electrical power received by the smart meter; and a voltage controller configured to control a voltage set point of the electrical power supplied by the substation based on the smart meter data. The smart meter may be configured to operate in a report-by-exception mode, which comprises sua sponte sending the smart meter data to the voltage controller when the measured component of electrical power is determined to be outside of a target component band.

The VCC system may further comprise: a second smart meter located at a second one of the plurality of user locations, the second smart meter being configured to generate second smart meter data based on a second measured component of electrical power received by the second smart meter, wherein the voltage controller is further configured to determine an average user voltage component by averaging the measured component of electrical power received by the smart meter and the second measured component of electrical power received by the second smart meter.

The substation may comprise: a load tap change transformer that adjusts the voltage set point value based on a load tap change coefficient; or a voltage regulator that adjusts the voltage set point value based on the energy delivery parameter. The substation may comprise a distribution bus that supplies the electrical power to the plurality of user locations, wherein an electrical power supply voltage component is measured on the distribution bus.

The voltage controller may be configured to increase the voltage set point when either the electrical power supply voltage component or the average user voltage component falls below a target voltage band. The voltage controller may be configured to adjust the voltage set point at a maximum rate of one load tap change step. The voltage controller may be configured to compare the measured component of electrical power received by the smart meter to a target component band and adjust the voltage set point based on a result of the comparison. The voltage controller may be configured to adjust the voltage set point based on the average user voltage component. The target component band may include a target voltage band, and the voltage controller may be configured to maintain the measured component of electrical power received by the smart meter within the target voltage band based on the result of the comparison.

According to a still further aspect of the disclosure, a method is provided for controlling electrical power supplied to a plurality of user locations. The method comprises: receiving smart meter data from a first one of the plurality of user locations; and adjusting a voltage set point at a substation based on the smart meter data, wherein the smart meter data is sua sponte generated at the first one of the plurality of user locations when a measured component of electrical power that is supplied to the first one of the plurality of user locations is determined to be outside of a target component band.

The method may further comprise maintaining the average user voltage component within the target voltage band. The method may further comprise measuring a voltage component of the supplied electrical power on a distribution bus. The method may further comprise increasing the voltage set point when either the electrical power supply voltage component or an average user voltage component falls below the target component band. The method may further comprise: selecting said smart meter for monitoring; and creating a connection to said smart meter after receiving the smart meter data sent sua sponte by said smart meter while operating in a report-by-exception mode. The method may further comprise de-selecting another smart meter from a group of smart meters previously selected to be monitored. The method may further comprise terminating a connection to said another smart meter. The method may further comprise: storing historical component data that includes at least one of an aggregated energy component data at a substation level, a voltage component data at a substation level, and a weather data; determining energy usage at each of the plurality of user locations; comparing the historical component data to the determined energy usage; and determining energy savings attributable to the system based on the results of the comparison of the historical component data to the determined energy usage. The target component band may include a target voltage band. The method may further comprise: determining the target voltage band; and comparing an average user voltage component to the target voltage band.

The voltage set point may be adjusted based on the result of comparing the average user voltage component to the target voltage band. The sua sponte smart meter data received from the smart meter may be representative of a low voltage limiting level in the system.

According to a still further aspect of the disclosure, a computer readable medium is provided that tangibly embodies and includes a computer program for controlling electrical power supplied to a plurality of user locations. The computer program comprises a plurality of code sections, including: a receiving smart meter data code section that, when executed on a computer, causes receiving smart meter data from a first one of the plurality of user locations; and a voltage set point adjusting code section that, when executed on a computer, causes adjusting a voltage set point at a substation based on the smart meter data, wherein the smart meter data is sua sponte generated at the first one of the plurality of user locations when a measured component of electrical power that is supplied to the first one of the plurality of user locations is determined to be outside of a target component band.

The computer program may comprise an average user voltage component maintaining code section that, when executed on the computer, causes maintaining the average user voltage component within the target voltage band. The computer program may comprise a voltage component measuring code section that, when executed on the computer, causes a voltage component of the supplied electrical power to be measured on a distribution bus. The computer program may include a voltage set point increasing code section that, when executed on the computer, causes increasing the voltage set point when either the electrical power supply voltage component or an average user voltage component falls below the target component band. The computer program may comprise: a smart meter selection code section that, when executed on the computer, causes selecting said smart meter for monitoring; and a connection creation code section that, when executed on the computer, causes creating a connection to said smart meter after receiving the smart meter data sent sua sponte by said smart meter while operating in a report-by-exception mode. The computer program may comprise a smart meter de-selecting code section that, when executed on the computer, causes de-selecting another smart meter from a group of smart meters previously selected to be monitored. The computer program may comprise connection terminating code section that, when executed on the computer, causes terminating a connection to said another smart meter.

The computer program may comprise: a storing code section that, when executed on the computer, causes storing historical component data that includes at least one of an aggregated energy component data at a substation level, a voltage component data at a substation level, and a weather data; an energy usage determining code section that, when executed on the computer, causes determining energy usage at each of the plurality of user locations; a comparing code section that, when executed on the computer, causes comparing the historical component data to the determined energy usage; and an energy savings determination code section that, when executed on the computer, causes determining energy savings attributable to the system based on the results of the comparison of the historical component data to the determined energy usage. The target component band may include a target voltage band. The computer program may comprise: a target voltage band determining code section that, when executed on the computer, causes determining the target voltage band; and a comparing code section that, when executed on the computer, causes comparing an average user voltage component to the target voltage band. The voltage set point may be adjusted based on the result of comparing the average user voltage component to the target voltage band. The sua sponte smart meter data received from the smart meter may be representative of a low voltage limiting level in the system.

Additional features, advantages, and embodiments of the disclosure may be set forth or apparent from consideration of the detailed description and drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying, drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 9 shows an example of the data collected (including voltage and energy measurement) hourly by the DMS in the example of FIG. 7, after application of the voltage control according to the principles of the disclosure;

FIG. 10 shows an example of calculation data for hours 1-5 and the average for the full twenty-four hours in the example of FIGS. 7-9;

FIG. 11 shows an example where data may be collected for weather variables for the days before and after voltage control and/or conservation, according to principles of the disclosure;

Figure 1:
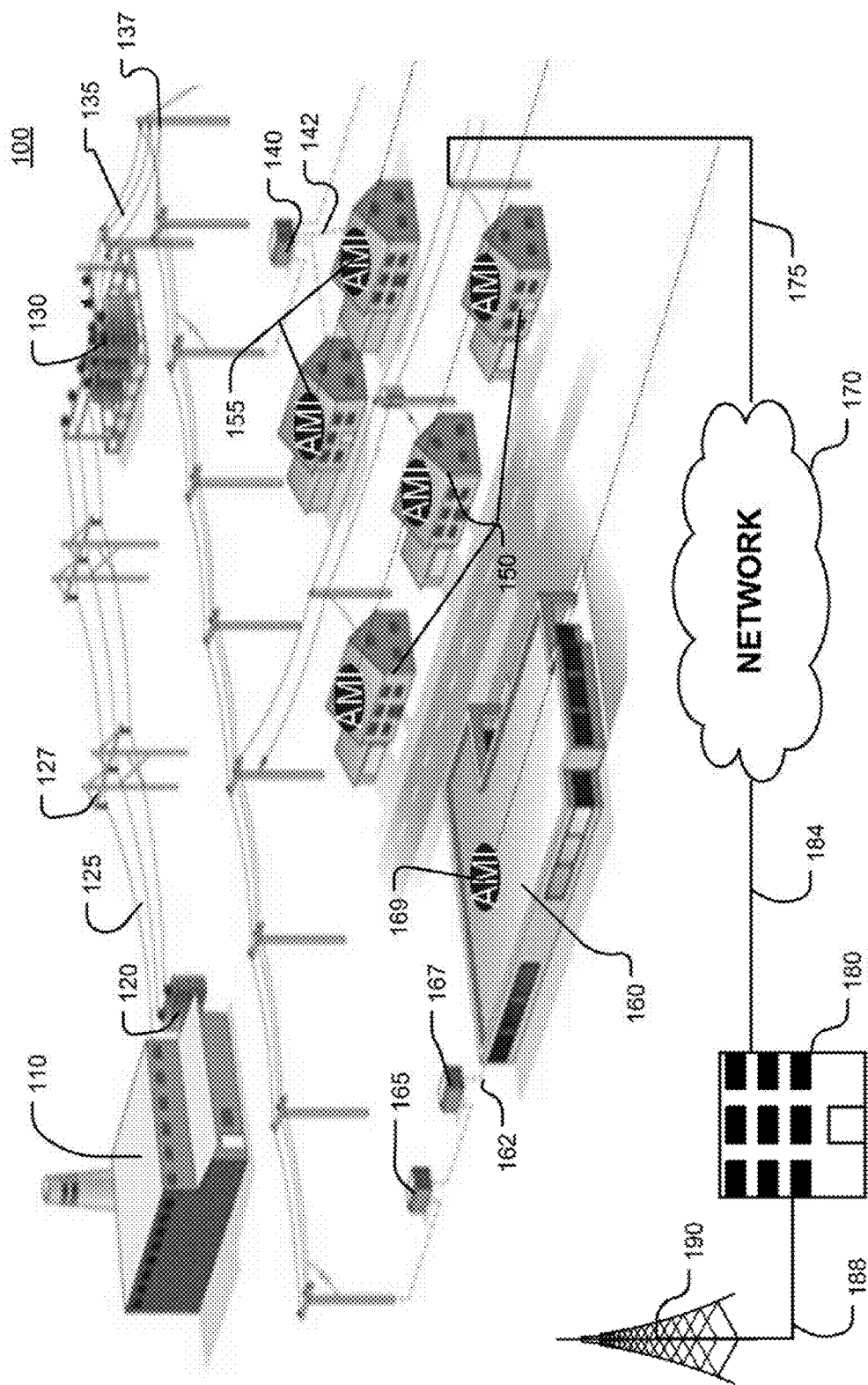
FIG. 1 shows an example of an electricity generation and distribution system, according to principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server", as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database", as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

According to one non-limiting example of the disclosure, a voltage control and conservation (VCC) system 200 is provided (shown in FIG. 2), which includes three subsystems, including an energy delivery (ED) system 300, an energy control (EC) system 400 and an energy regulation (ER) system 500. The VCC system 200 is configured to monitor energy usage at the ED system 300 and determine one or more energy delivery parameters $C_{ED}$ at the EC system (or voltage controller) 400. The EC system 400 may then provide the one or more energy delivery parameters $C_{ED}$ to the ER system 500 to adjust the energy delivered to a plurality of users for maximum energy conservation.

The VCC system 200 may be integrated into, for example, an existing load curtailment plan of an electrical power supply system. The electrical power supply system may include an emergency voltage reduction plan, which may be activated when one or more predetermined events are triggered. The predetermined events may include, for example, an emergency, a short circuit, an overheating of electrical conductors, when the electrical power output from the transformer exceeds, for example, 80% of its power rating, or the like. The VCC system 200 is configured to yield to the load curtailment plan when the one or more predetermined events are triggered, allowing the load curtailment plan to be executed to reduce the voltage of the electrical power supplied to the plurality of users.

FIG. 1 shows an example of an electricity generation and distribution system 100, according to principles of the disclosure. The electricity generation and distribution system 100 includes an electrical power generating station 110, a generating step-up transformer 120, a substation 130, a plurality of step-down transformers 140, 165, 167, and users 150, 160. The electrical power generating station 110 generates electrical power that is supplied to the step-up transformer 120. The step-up transformer steps-up the voltage of the electrical power and supplies the stepped-up electrical power to an electrical transmission media 125.

As seen in FIG. 1, the electrical transmission media may include wire conductors, which may be carried above ground by, for example, utility poles 127 and/or under ground by, for example, shielded conductors (not shown). The electrical power is supplied from the step-up transformer 120 to the substation 130 as electrical power $E_{In}(t)$, where the electrical power $E_{In}$ in MegaWatts (MW) may vary as a function of time t. The substation 130 converts the received electrical power $E_{In}(t)$ to $E_{Supply}(t)$ and supplies the converted electrical power $E_{Supply}(t)$ to the plurality of users 150, 160. The substation 130 may adjustably transform the voltage component $V_{In}(t)$ of the received electrical power $E_{In}(t)$ by, for example, stepping-down the voltage before supplying the electrical power $E_{Supply}(t)$ to the users 150, 160. The electrical power $E_{Supply}(t)$ supplied from the substation 130 may be received by the step-down transformers 140, 165, 167 and supplied to the users 150, 160 through a transmission medium 142, 162, such as, for example, but not limited to, underground electrical conductors (and/or above ground electrical conductors).

Each of the users 150, 160 may include an Advanced Meter Infrastructure (AMI) 155, 169. The AMI 155, 169 may be coupled to a Regional Operations Center (ROC) 180. The ROC 180 may be coupled to the AMI 155, 169, by means of a plurality of communication links 175, 184, 188, a network 170 and/or a wireless communication system 190. The wireless communication system 190 may include, but is not limited to, for example, an RF transceiver, a satellite transceiver, and/or the like.

The network 170 may include, for example, at least one of the Internet, a local area network (LAN), a wide area network (WAN), a metropolitan area network (MAN), a personal area network (PAN), a campus area network, a corporate area network, a global area network (GAN), a broadband area network (BAN), or the like, any of which may be configured to communicate data via a wireless and/or a wired communication medium. The network 170 may be configured to include a network topology such as, for example, a ring, a mesh, a line, a tree, a star, a bus, a full connection, or the like.

The AMI 155, 169 may include any one or more of the following: A smart meter; a network interface (for example, a WAN interface, or the like); firmware; software; hardware; and the like. The smart meter may be configured to determine any one or more of the following: kilo-Watt-hours (kWh) delivered; kWh received; kWh delivered plus kWh received; kWh delivered minus kWh received; interval data; demand data; and the like. If the smart meter is a three phase meter, then the low phase voltage may be used in the average calculation. If the meter is a single phase meter, then the single voltage component will be averaged.

The AMI 155, 169 may further include one or more collectors (shown in FIG. 2) configured to collect smart meter data from one or more smart meters tasked with, for example, measuring and reporting electric power delivery and consumption at one or more of the users 150, 160. Alternatively (or additionally), the one or more collectors may be located external to the users 150, 160, such as, for example, in a housing holding the step-down transformers 140, 165, 167. Each of the collectors may be configured to communicate with the ROC 180.

VCC System 200

Figure 2:
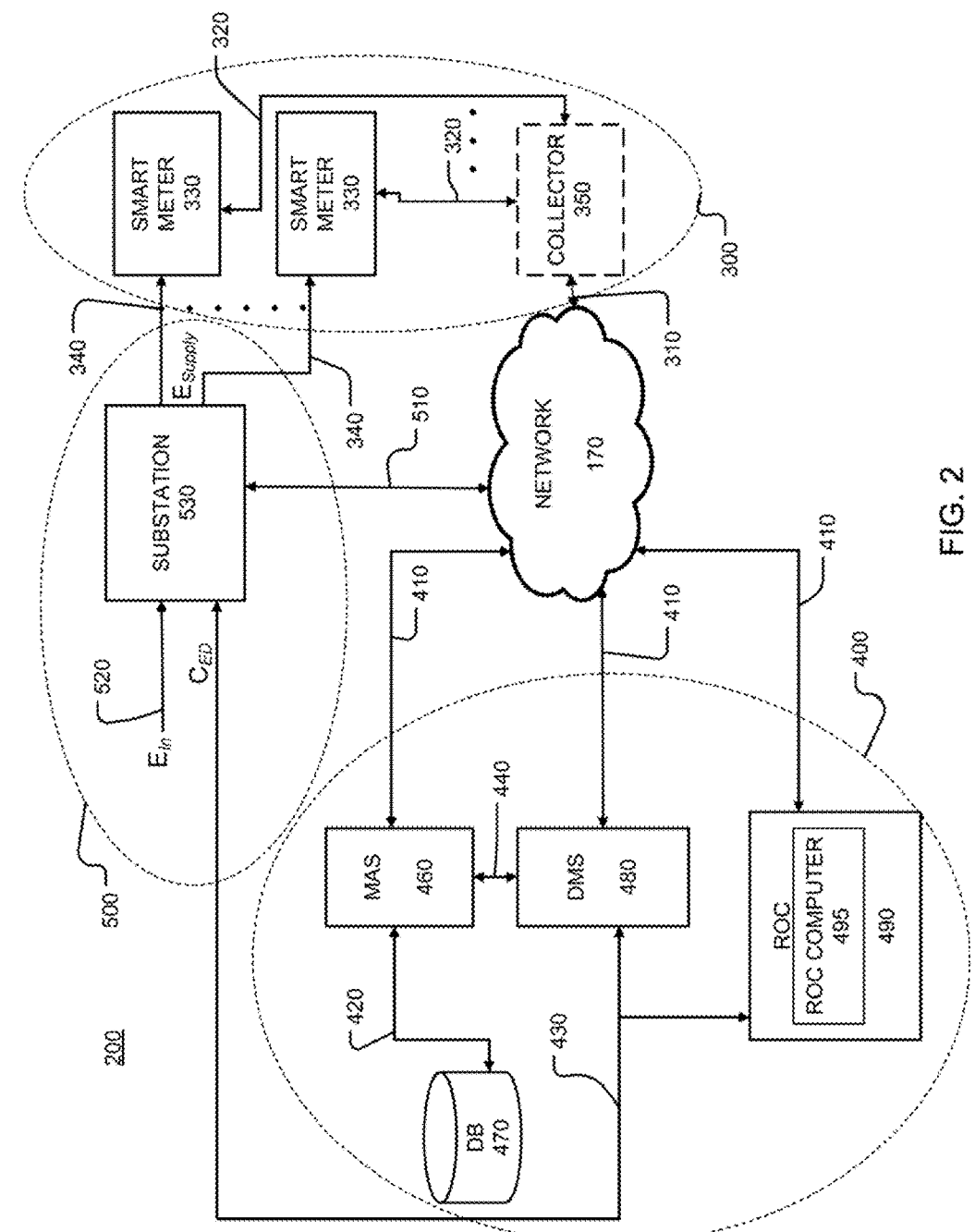
FIG. 2 shows an example of a voltage control and conservation (VCC) system, according to the principles of the disclosure.

FIG. 2 shows an example of the VCC system 200, according to principles of the disclosure. The VCC system 200 includes the ED system 300, the EC system 400 and the ER system 500, each of which is shown as a broken-line ellipse. The VCC system 200 is configured to monitor energy usage at the ED system 300. The ED system 300 monitors energy usage at one or more users 150, 160 (shown in FIG. 1) and sends energy usage information to the EC system 400. The EC system 400 processes the energy usage information and generates one or more energy delivery parameters $C_{ED}$, which it sends to the ER system 500. The ER system 500 receives the one or more energy delivery parameters $C_{ED}$ and adjusts the electrical power $E_{Supply}(t)$ supplied to the users 150, 160 based on the received energy delivery parameters $C_{ED}$.

The VCC system 200 minimizes power system losses, reduces user energy consumption and provides precise user voltage control. The VCC system 200 may include a closed loop process control application that uses user voltage data provided by the ED system 300 to control, for example, a voltage set point $V_{SP}$ on a distribution circuit (not shown) within the ER system 500. That is, the VCC system 200 may control the voltages $V_{Supply}(t)$ of the electrical power $E_{Supply}(t)$ supplied to the users 150, 160, by adjusting the voltage set point $V_{SP}$ of the distribution circuit in the ER system 500, which may include, for example, one or more load tap changing (LTC) transformers, one or more voltage regulators, or other voltage controlling equipment to maintain a tighter band of operation of the voltages $V_{Delivered}(t)$ of the electric power $E_{Delivered}(t)$ delivered to the users 150, 160, to lower power losses and facilitate efficient use of electrical power $E_{Delivered}(t)$ at the user locations 150 or 160.

The VCC system 200 controls or adjusts the voltage $V_{Supply}(t)$ of the electrical power $E_{Supply}(t)$ supplied from the EC system 500 based on smart meter data, which includes measured voltage $V_{Meter}(t)$ data from the users 150, 160 in the ED system 300. The VCC system 200 may adjust the voltage set point $V_{SP}$ at the substation or line regulator level in the ER system 500 by, for example, adjusting the LTC transformer (not shown), circuit regulators (not shown), or the like, to maintain the user voltages $V_{Meter}(t)$ in a target voltage band $V_{Band-n}$, which may include a safe nominal operating range.

The VCC system 200 is configured to maintain the electrical power $E_{Delivered}(t)$ delivered to the users 150, 160 within one or more voltage bands $V_{Band-n}$. For example, the energy may be delivered in two or more voltage bands $V_{Band-n}$ substantially simultaneously, where the two or more voltage bands may be substantially the same or different. The value $V_{Band-n}$ may be determined by the following expression [1]:

$$V_{Band-n} = V_{SP} \pm \Delta V \quad [1]$$

where $V_{Band-n}$ is a range of voltages, n is a positive integer greater than zero corresponding to the number of voltage bands $V_{Band}$ that may be handled at substantially the same time, $V_{SP}$ is the voltage set point value and $\Delta V$ is a voltage deviation range.

For example, the VCC system 200 may maintain the electrical power $E_{Delivered}(t)$ delivered to the users 150, 160 within a band $V_{Band-1}$ equal to, for example, 111V to 129V for rural applications, where $V_{SP}$ is set to 120V and $\Delta V$ is set to a deviation of seven-and-one-half percent (+/−7.5%). Similarly, the VCC system 200 may maintain the electrical power $E_{Delivered}(t)$ delivered to the users 150, 160 within a band $V_{Band-2}$ equal to, for example, 114V to 126V for urban applications, where $V_{SP}$ is set to 120V and $\Delta V$ is set to a deviation of five (+/−5%).

The VCC system 200 may maintain the electrical power $E_{Delivered}(t)$ delivered to the users 150, 160 at any voltage band $V_{Band-n}$ usable by the users 150, 160, by determining appropriate values for $V_{SP}$ and $\Delta V$. In this regard, the values $V_{SP}$ and $\Delta V$ may be determined by the EC system 400 based on the energy usage information for users 150, 160, received from the ED system 300.

The EC system 400 may send the $V_{SP}$ and $\Delta V$ values to the ER system 500 as energy delivery parameters $C_{ED}$, which may also include the value $V_{Band-n}$. The ER system 500 may then control and maintain the voltage $V_{Delivered}(t)$ of the electrical power $E_{Delivered}(t)$ delivered to the users 150, 160, within the voltage band $V_{Band-n}$. The energy delivery parameters $C_{ED}$ may further include, for example, load-tap-changer (LTC) control commands.

The VCC system 200 may further measure and validate energy savings by comparing energy usage by the users 150, 160 before a change in the voltage set point value $V_{SP}$ (or voltage band $V_{Band-n}$) to the energy usage by the users 150, 160 after a change in the voltage set point value $V_{SP}$ (or voltage band $V_{Band-n}$), according to principles of the disclosure. These measurements and validations may be used to determine the effect in overall energy savings by, for example, lowering the voltage $V_{Delivered}(t)$ of the electrical power $E_{Delivered}(t)$ delivered to the users 150, 160, and to determine optimal delivery voltage bands $V_{Band-n}$ for the energy power $E_{Delivered}(t)$ delivered to the users 150, 160.

ER System 500

The ER system 500 may communicate with the ED system 300 and/or EC system 400 by means of the network 170. The ER system 500 is coupled to the network 170 and the EC system 400 by means of communication links 510 and 430, respectively. The EC system 500 is also coupled to the ED system 300 by means of the power lines 340, which may include communication links.

The ER system 500 includes a substation 530 which receives the electrical power supply $E_{In}(t)$ from, for example, the power generating station 110 (shown in FIG. 1) on a line 520. The electrical power $E_{In}(t)$ includes a voltage $V_{In}(t)$ component and a current $I_{In}(t)$ component. The substation 530 adjustably transforms the received electrical power $E_{In}(t)$ to, for example, reduce (or step-down) the voltage component $V_{In}(t)$ of the electrical power $E_{In}(t)$ to a voltage value $V_{Supply}(t)$ of the electrical power $E_{Supply}(t)$ supplied to the plurality of smart meters 330 on the power supply lines 340.

The substation 530 may include a transformer (not shown), such as, for example, a load tap change (LTC) transformer. In this regard, the substation 530 may further include an automatic tap changer mechanism (not shown), which is configured to automatically change the taps on the LTC transformer. The tap changer mechanism may change the taps on the LTC transformer either on-load (on-load tap changer, or OLTC) or off-load, or both. The tap changer mechanism may be motor driven and computer controlled. The substation 530 may also include a buck/boost transformer to adjust and maximize the power factor of the electrical power $E_{Delivered}(t)$ supplied to the users on power supply lines 340.

Additionally (or alternatively), the substation 530 may include one or more voltage regulators, or other voltage controlling equipment, as known by those having ordinary skill in the art, that may be controlled to maintain the output the voltage component $V_{Supply}(t)$ of the electrical power $E_{Supply}(t)$ at a predetermined voltage value or within a predetermined range of voltage values.

The substation 530 receives the energy delivery parameters $C_{ED}$ from the EC system 400 on the communication link 430. The energy delivery parameters $C_{ED}$ may include, for example, load tap coefficients when an LTC transformer is used to step-down the input voltage component $V_{In}(t)$ of the electrical power $E_{In}(t)$ to the voltage component $V_{Supply}(t)$ of the electrical power $E_{Supply}(t)$ supplied to the ED system 300. In this regard, the load tap coefficients may be used by the ER system 500 to keep the voltage component $V_{Supply}(t)$ on the low-voltage side of the LTC transformer at a predetermined voltage value or within a predetermined range of voltage values.

The LTC transformer may include, for example, seventeen or more steps (thirty-five or more available positions), each of which may be selected based on the received load tap coefficients. Each change in step may adjust the voltage component $V_{Supply}(t)$ on the low voltage side of the LTC transformer by as little as, for example, about five-thousandths (0.5%), or less.

Alternatively, the LTC transformer may include fewer than seventeen steps. Similarly, each change in step of the LTC transformer may adjust the voltage component $V_{Supply}(t)$ on the low voltage side of the LTC transformer by more than, for example, about five-thousandths (0.5%).

The voltage component $V_{Supply}(t)$ may be measured and monitored on the low voltage side of the LTC transformer by, for example, sampling or continuously measuring the voltage component $V_{Supply}(t)$ of the stepped-down electrical power $E_{Supply}(t)$ and storing the measured voltage component $V_{Supply}(t)$ values as a function of time t in a storage (not shown), such as, for example, a computer readable medium. The voltage component $V_{Supply}(t)$ may be monitored on, for example, a substation distribution bus, or the like. Further, the voltage component $V_{Supply}(t)$ may be measured at any point where measurements could be made for the transmission or distribution systems in the ER system 500.

Similarly, the voltage component $V_{In}(t)$ of the electrical power $E_{In}(t)$ input to the high voltage side of the LTC transformer may be measured and monitored. Further, the current component $I_{Supply}(t)$ of the stepped-down electrical power $E_{Supply}(t)$ and the current component $I_{In}(t)$ of the electrical power $E_{In}(t)$ may also be measured and monitored. In this regard, a phase difference $\phi_{In}(t)$ between the voltage $V_{In}(t)$ and current $I_{In}(t)$ components of the electrical power $E_{In}(t)$ may be determined and monitored. Similarly, a phase difference $\phi_{Supply}(t)$ between the voltage $V_{Supply}(t)$ and current $I_{Supply}(t)$ components of the electrical energy supply $E_{Supply}(t)$ may be determined and monitored.

The ER system 500 may provide electrical energy supply status information to the EC system 400 on the communication links 430 or 510. The electrical energy supply information may include the monitored voltage component $V_{Supply}(t)$. The electrical energy supply information may further include the voltage component $V_{In}(t)$, current components $I_{In}(t)$, $I_{Supply}(t)$, and/or phase difference values $\phi_{In}(t)$, $\phi_{Supply}(t)$, as a function of time t. The electrical energy supply status information may also include, for example, the load rating of the LTC transformer.

The electrical energy supply status information may be provided to the EC system 400 at periodic intervals of time, such as, for example, every second, 5 sec., 10 sec., 30 sec., 60 sec., 120 sec., 600 sec., or any other value within the scope and spirit of the disclosure, as determined by one having ordinary skill in the art. The periodic intervals of time may be set by the EC system 400 or the ER system 500. Alternatively, the electrical energy supply status information may be provided to the EC system 400 or ER system 500 intermittently.

Further, the electrical energy supply status information may be forwarded to the EC system 400 in response to a request by the EC system 400, or when a predetermined event is detected. The predetermined event may include, for example, when the voltage component $V_{Supply}(t)$ changes by an amount greater (or less) than a defined threshold value $V_{SupplyThreshold}$ (for example, 130V) over a predetermined interval of time, a temperature of one or more components in the ER system 500 exceeds a defined temperature threshold, or the like.

ED System 300

The ED system 300 includes a plurality of smart meters 330. The ED system 300 may further include at least one collector 350, which is optional. The ED system 300 may be coupled to the network 170 by means of a communication link 310. The collector 350 may be coupled to the plurality of smart meters 330 by means of a communication link 320. The smart meters 330 may be coupled to the ER system 500 by means of one or more power supply lines 340, which may also include communication links.

Each smart meter 330 is configured to measure, store and report energy usage data by the associated users 150, 160 (shown in FIG. 1). Each smart meter 330 is further configured to measure and determine energy usage at the users 150, 160, including the voltage component $V_{Meter}(t)$ and current component $I_{Meter}(t)$ of the electrical power $E_{Meter}(t)$ used by the users 150, 160, as a function of time. The smart meters 330 may measure the voltage component $V_{Meter}(t)$ and current component $I_{Meter}(t)$ of the electrical power $E_{Meter}(t)$ at discrete times $t_s$, where s is a sampling period, such as, for example, s=5 sec., 10 sec., 30 sec., 60 sec., 300 sec., 600 sec., or more. For example, the smart meters 330 may measure energy usage every, for example, minute ($t_{60\,sec}$), five minutes ($t_{300\,sec}$), ten minutes ($t_{600\,sec}$), or more, or at time intervals variably set by the smart meter 330 (for example, using a random number generator).

The smart meters 330 may average the measured voltage $V_{Meter}(t)$ and/or $I_{Meter}(t)$ values over predetermined time intervals (for example, 5 min., 10 min., 30 min., or more). The smart meters 330 may store the measured electrical power usage $E_{Meter}(t)$, including the measured voltage component $V_{Meter}(t)$ and/or current component $I_{Meter}(t)$ as smart meter data in a local (or remote) storage (not shown), such as, for example, a computer readable medium.

Each smart meter 330 is also capable of operating in a "report-by-exception" mode for any voltage $V_{Meter}(t)$, current $I_{Meter}(t)$, or energy usage $E_{Meter}(t)$ that falls outside of a target component band. The target component band may include, a target voltage band, a target current band, or a target energy usage band. In the "report-by-exception" mode, the smart meter 330 may sua sponte initiate communication and send smart meter data to the EC system 400. The "report-by-exception" mode may be used to reconfigure the smart meters 330 used to represent, for example, the lowest voltages on the circuit as required by changing system conditions.

The smart meter data may be periodically provided to the collector 350 by means of the communication links 320. Additionally, the smart meters 330 may provide the smart meter data in response to a smart meter data request signal received from the collector 350 on the communication links 320.

Alternatively (or additionally), the smart meter data may be periodically provided directly to the EC system 400 (for example, the MAS 460) from the plurality of smart meters, by means of, for example, communication links 320, 410 and network 170. In this regard, the collector 350 may be bypassed, or eliminated from the ED system 300. Furthermore, the smart meters 330 may provide the smart meter data directly to the EC system 400 in response to a smart meter data request signal received from the EC system 400. In the absence of the collector 350, the EC system (for example, the MAS 460) may carry out the functionality of the collector 350 described herein.

The request signal may include, for example, a query (or read) signal and a smart meter identification signal that identifies the particular smart meter 330 from which smart meter data is sought. The smart meter data may include the following information for each smart meter 130, including, for example, kilo-Watt-hours (kWh) delivered data; kWh received data, kWh delivered plus kWh received data, kWh delivered minus kWh received data, voltage level data, current level data, phase angle between voltage and current, kVar data, time interval data, demand data, and the like.

Additionally, the smart meters 330 may send the smart meter data to the meter automation system server MAS 460. The smart meter data may be sent to the MAS 460 periodically according to a predetermined schedule or upon request from the MAS 460.

The collector 350 is configured to receive the smart meter data from each of the plurality of smart meters 330 via the communication links 320. The collector 350 stores the received smart meter data in a local storage (not shown), such as, for example, a computer readable medium. The collector 350 compiles the received smart meter data into a collector data. In this regard, the received smart meter data may be aggregated into the collector data based on, for example, a geographic zone in which the smart meters 330 are located, a particular time band (or range) during which the smart meter data was collected, a subset of smart meters 330 identified in a collector control signal, and the like. In compiling the received smart meter data, the collector 350 may average the voltage component $V_{Meter}(t)$ values received in the smart meter data from all (or a subset of all) of the smart meters 330.

The EC system 400 is able to select or alter a subset of all of the smart meters 330 to be monitored for predetermined time intervals, which may include for example 15 minute intervals. It is noted that the predetermined time intervals may be shorter or longer than 15 minutes. The subset of all of the smart meters 330 is selectable and can be altered by the EC system 400 as needed to maintain minimum level control of the voltage $V_{Supply}(t)$ supplied to the smart meters 330.

The collector 350 may also average the electrical power $E_{Meter}(t)$ values received in the smart meter data from all (or a subset of all) of the smart meters 330. The compiled collector data may be provided by the collector 350 to the EC system 400 by means of the communication link 310 and network 170. For example, the collector 350 may send the compiled collector data to the MAS 460 (or ROC 490) in the EC system 400.

The collector 350 is configured to receive collector control signals over the network 170 and communication link 310 from the EC system 400. Based on the received collector control signals, the collector 350 is further configured to select particular ones of the plurality of smart meters 330 and query the meters for smart meter data by sending a smart meter data request signal to the selected smart meters 330. The collector 350 may then collect the smart meter data that it receives from the selected smart meters 330 in response to the queries. The selectable smart meters 330 may include any one or more of the plurality of smart meters 330. The collector control signals may include, for example, an identification of the smart meters 330 to be queried (or read), time(s) at which the identified smart meters 330 are to measure the $V_{Meter}(t)$, $I_{Meter}(t)$, $E_{Meter}(t)$ and/or $\phi_{Meter}(t)$ ($\phi_{Meter}(t)$ is the phase difference between the voltage $V_{Meter}(t)$ and current $I_{Meter}(t)$ components of the electrical power $E_{Meter}(t)$ measured at the identified smart meter 330), energy usage information since the last reading from the identified smart meter 330, and the like. The collector 350 may then compile and send the compiled collector data to the MAS 460 (and/or ROC 490) in the EC system 400.

EC System 400

The EC system 400 may communicate with the ED system 300 and/or ER system 500 by means of the network 170. The EC system 400 is coupled to the network 170 by means of one or more communication links 410. The EC system 400 may also communicate directly with the ER system 500 by means of a communication link 430.

The EC system 400 includes the MAS 460, a database (DB) 470, a distribution management system (DMS) 480, and a regional operation center (ROC) 490. The ROC 490 may include a computer (ROC computer) 495, a server (not shown) and a database (not shown). The MAS 460 may be coupled to the DB 470 and DMS 480 by means of communication links 420 and 440, respectively. The DMS 480 may be coupled to the ROC 490 and ER SYSTEM 500 by means of the communication link 430. The database 470 may be located at the same location as (for example, proximate to, or within) the MAS 460, or at a remote location that may be accessible via, for example, the network 170.

The EC system 400 is configured to de-select, from the subset of monitored smart meters 330, a smart meter 330 that the EC system 400 previously selected to monitor, and select the smart meter 330 that is outside of the subset of monitored smart meters 330, but which is operating in the report-by-exception mode. The EC system 400 may carry out this change after receiving the sua sponte smart meter data from the non-selected smart meter 330. In this regard, the EC system 400 may remove or terminate a connection to the de-selected smart meter 330 and create a new connection to the newly selected smart meter 330 operating in the report-by-exception mode. The EC system 400 is further configured to select any one or more of the plurality of smart meters 330 from which it receives smart meter data comprising, for example, the lowest measured voltage component $V_{Meter}(t)$, and generate an energy delivery parameter $C_{ED}$ based on the smart meter data received from the smart meter(s) 330 that provide the lowest measured voltage component $V_{Meter}(t)$.

The MAS 460 may include a computer (not shown) that is configured to receive the collector data from the collector 350, which includes smart meter data collected from a selected subset (or all) of the smart meters 330. The MAS 460 is further configured to retrieve and forward smart meter data to the ROC 490 in response to queries received from the ROC 490. The MAS 460 may store the collector data, including smart meter data in a local storage and/or in the DB 470.

The DMS 480 may include a computer that is configured to receive the electrical energy supply status information from the substation 530. The DMS 480 is further configured to retrieve and forward measured voltage component $V_{Meter}(t)$ values and electrical power $E_{Meter}(t)$ values in response to queries received from the ROC 490. The DMS 480 may be further configured to retrieve and forward measured current component $I_{Meter}(t)$ values in response to queries received from the ROC 490. The DMS 480 also may be further configured to retrieve all "report-by-exception" voltages $V_{Meter}(t)$ from the smart meters 330 operating in the "report-by-exception" mode and designate the voltages $V_{Meter}(t)$ as one of the control points to be continuously read at predetermined times (for example, every 15 minutes, or less (or more), or at varying times). The "report-by-exception voltages $V_{Meter}(t)$ may be used to control the EC 500 set points.

The DB 470 may include a plurality of relational databases (not shown). The DB 470 includes a large number of records that include historical data for each smart meter 330, each collector 350, each substation 530, and the geographic area(s) (including latitude, longitude, and altitude) where the smart meters 330, collectors 350, and substations 530 are located.

For instance, the DB 470 may include any one or more of the following information for each smart meter 330, including: a geographic location (including latitude, longitude, and altitude); a smart meter identification number; an account number; an account name; a billing address; a telephone number; a smart meter type, including model and serial number; a date when the smart meter was first placed into use; a time stamp of when the smart meter was last read (or queried); the smart meter data received at the time of the last reading; a schedule of when the smart meter is to be read (or queried), including the types of information that are to be read; and the like.

The historical smart meter data may include, for example, the electrical power $E_{Meter}(t)$ used by the particular smart meter 330, as a function of time. Time t may be measured in, for example, discrete intervals at which the electrical power $E_{Meter}$ magnitude (kWh) of the received electrical power $E_{Meter}(t)$ is measured or determined at the smart meter 330. The historical smart meter data includes a measured voltage component $V_{Meter}(t)$ of the electrical energy $E_{Meter}(t)$ received at the smart meter 330. The historical smart meter data may further include a measured current component $I_{Meter}(t)$ and/or phase difference $\phi_{Meter}(t)$ of the electrical power $E_{Meter}(t)$ received at the smart meter 330.

As noted earlier, the voltage component $V_{Meter}(t)$ may be measured at a sampling period of, for example, every five seconds, ten seconds, thirty seconds, one minute, five minutes, ten minutes, fifteen minutes, or the like. The current component $I_{Meter}(t)$ and/or the received electrical power $E_{Meter}(t)$ values may also be measured at substantially the same times as the voltage component $V_{Meter}(t)$.

Given the low cost of memory, the DB 470 may include historical data from the very beginning of when the smart meter data was first collected from the smart meters 330 through to the most recent smart meter data received from the smart meter 330s.

The DB 470 may include a time value associated with each measured voltage component $V_{Meter}(t)$, current component $I_{Meter}(t)$, phase component $\phi_{Meter}(t)$ and/or electrical power $E_{Meter}(t)$, which may include a timestamp value generated at the smart meter 330. The timestamp value may include, for example, a year, a month, a day, an hour, a minute, a second, and a fraction of a second. Alternatively, the timestamp may be a coded value which may be decoded to determine a year, a month, a day, an hour, a minute, a second, and a fraction of a second, using, for example, a look up table. The ROC 490 and/or smart meters 330 may be configured to receive, for example, a WWVB atomic clock signal transmitted by the U.S. National Institute of Standards and Technology (NIST), or the like and synchronize its internal clock (not shown) to the WWVB atomic clock signal.

The historical data in the DB 470 may further include historical collector data associated with each collector 350. The historical collector data may include any one or more of the following information, including, for example: the particular smart meters 330 associated with each collector 350; the geographic location (including latitude, longitude, and altitude) of each collector 350; a collector type, including model and serial number; a date when the collector 350 was first placed into use; a time stamp of when collector data was last received from the collector 350; the collector data that was received; a schedule of when the collector 350 is expected to send collector data, including the types of information that are to be sent; and the like.

The historical collector data may further include, for example, an external temperature value $T_{Collector}(t)$ measured outside of each collector 350 at time t. The historical collector data may further include, for example, any one or more of the following for each collector 350: an atmospheric pressure value $P_{Collector}(t)$ measured proximate the collector 350 at time t; a humidity value $H_{Collector}(t)$ measured proximate the collector 350 at time t; a wind vector value $W_{Collector}(t)$ measured proximate the collector 350 at time t, including direction and magnitude of the measured wind; a solar irradiant value $L_{Collector}(t)$ (kW/m²) measured proximate the collector 350 at time t; and the like.

The historical data in the DB 470 may further include historical substation data associated with each substation 530. The historical substation data may include any one or more of the following information, including, for example: the identifications of the particular smart meters 330 supplied with electrical energy $E_{Supply}(t)$ by the substation 530; the geographic location (including latitude, longitude, and altitude) of the substation 530; the number of distribution circuits; the number of transformers; a transformer type of each transformer, including model, serial number and maximum Megavolt Ampere (MVA) rating; the number of voltage regulators; a voltage regulator type of each voltage regulator, including model and serial number; a time stamp of when substation data was last received from the substation 530; the substation data that was received; a schedule of when the substation 530 is expected to provide electrical energy supply status information, including the types of information that are to be provided; and the like.

The historical substation data may include, for example, the electrical power $E_{Supply}(t)$ supplied to each particular smart meter 330, where $E_{Supply}(t)$ is measured or determined at the output of the substation 530. The historical substation data includes a measured voltage component $V_{Supply}(t)$ of the supplied electrical power $E_{Supply}(t)$, which may be measured, for example, on the distribution bus (not shown) from the transformer. The historical substation data may further include a measured current component $I_{Supply}(t)$ of the supplied electrical power $E_{Supply}(t)$. As noted earlier, the voltage component $V_{Supply}(t)$, the current component $I_{Supply}(t)$, and/or the electrical power $E_{Supply}(t)$ may be measured at a sampling period of, for example, every five seconds, ten seconds, thirty seconds, a minute, five minutes, ten minutes, or the like. The historical substation data may further include a phase difference value $\phi_{Supply}(t)$ between the voltage $V_{Supply}(t)$ and current $I_{Supply}(t)$ signals of the electrical power $E_{Supply}(t)$, which may be used to determine the power factor of the electrical power $E_{Supply}(t)$ supplied to the smart meters 330.

The historical substation data may further include, for example, the electrical power $E_{In}(t)$ received on the line 520 at the input of the substation 530, where the electrical power $E_{In}(t)$ is measured or determined at the input of the substation 530. The historical substation data may include a measured voltage component $V_{In}(t)$ of the received electrical power $E_{In}(t)$, which may be measured, for example, at the input of the transformer. The historical substation data may further include a measured current component $I_{In}(t)$ of the received electrical power $E_{In}(t)$. As noted earlier, the voltage component $V_{In}(t)$, the current component $I_{In}(t)$, and/or the electrical power $E_{In}(t)$ may be measured at a sampling period of, for example, every five seconds, ten seconds, thirty seconds, a minute, five minutes, ten minutes, or the like. The historical substation data may further include a phase difference $\phi_{In}(t)$ between the voltage component $V_{In}(t)$ and current component $I_{In}(t)$ of the electrical power $E_{In}(t)$. The power factor of the electrical power $E_{In}(t)$ may be determined based on the phase difference $\phi_{In}(t)$.

According to an aspect of the disclosure, the EC system 400 may save aggregated kW data at the substation level, voltage data at the substation level, and weather data to compare to energy usage per smart meter 330 to determine the energy savings from the VCC system 200, and using linear regression to remove the affects of weather, load growth, economic effects, and the like, from the calculation.

In the VCC system 200, control may be initiated from, for example, the ROC computer 495. In this regard, a control screen 305 may be displayed on the ROC computer 495, as shown, for example, in FIG. 3. The control screen 305 may correspond to data for a particular substation 530 (for example, the TRABUE SUBSTATION) in the ER system 500. The ROC computer 495 can control and override (if necessary), for example, the substation 530 load tap changing transformer based on, for example, the smart meter data received from the ED system 300 for the users 150, 160. The ED system 300 may determine the voltages of the electrical power supplied to the user locations 150, 160, at predetermined (or variable) intervals, such as, e.g., on average each 15 minutes, while maintaining the voltages within required voltage limits.

For system security, the substation 530 may be controlled through the direct communication link 430 from the ROC 490 and/or DMS 480.

Furthermore, an operator can initiate a voltage control program on the ROC computer 490, overriding the controls, if necessary, and monitoring a time it takes to read the user voltages $V_{Meter}(t)$ being used for control of, for example, the substation LTC transformer (not shown) in the ER system 500.

Figure 4:
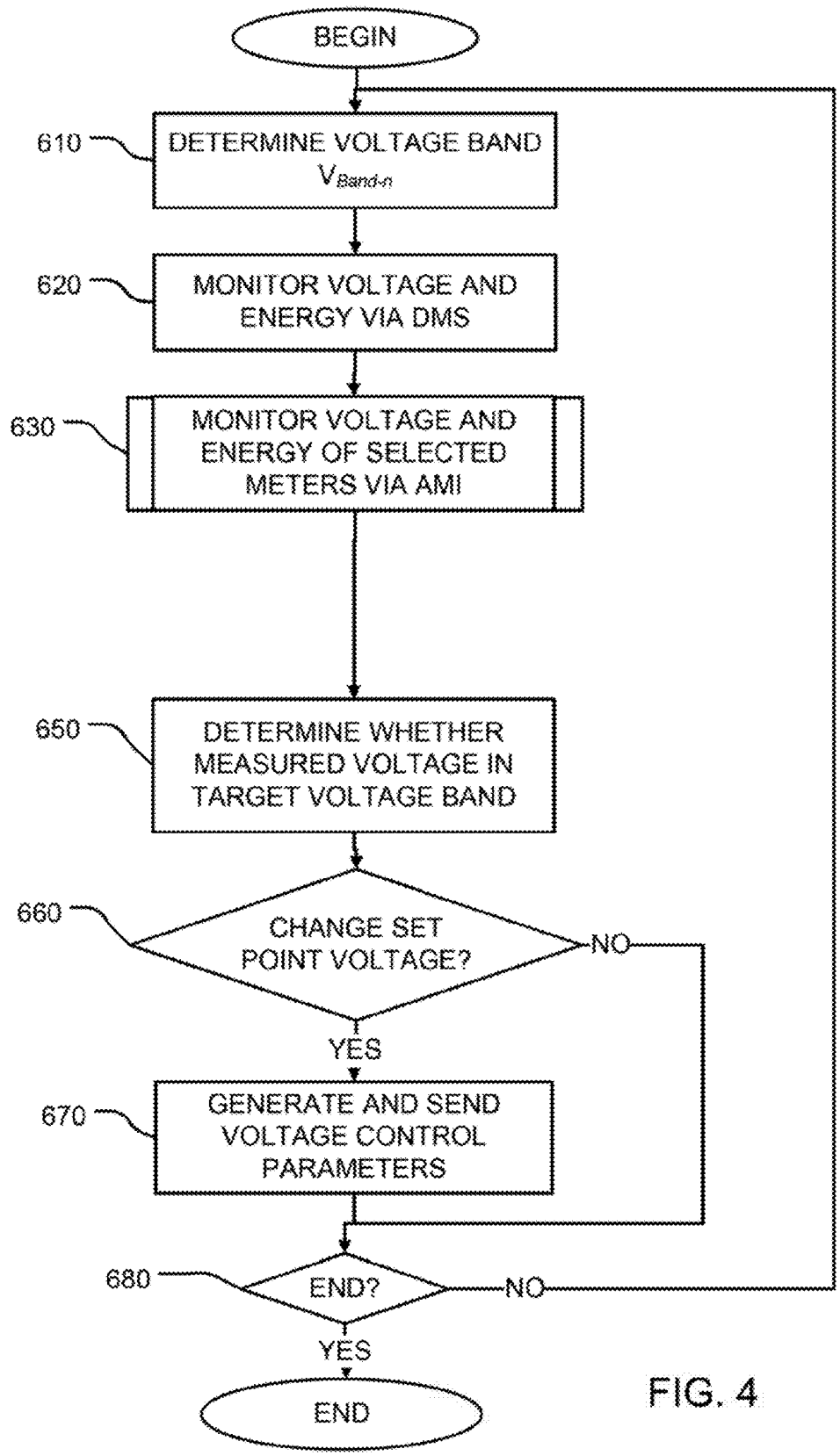
FIG. 4 shows an example of a voltage control and conservation (VCC) process according to principles of the disclosure.

FIG. 4 shows an example of a voltage control and conservation (VCC) process according to principles of the disclosure. The VCC process may be carried out by, for example, but not limited to, the VCC system 200 shown in FIG. 2.

Referring to FIGS. 2 and 4, a target voltage band $V_{Band-n}$ may be determined for the voltage component $V_{Meter}(t)$ of the electrical power $E_{Meter}(t)$ received and measured at the smart meters 330 (Step 610). The target voltage band $V_{Band-n}$ may be determined by setting a voltage set point value $V_{SP}$ and a permissible voltage deviation range $\Delta V$ according to the expression [1] $V_{Band-n} = V_{SP} + \Delta V$. For instance, the voltage set point $V_{SP}$ value may be set to 120V with a permissible voltage deviation of $\Delta V$ of five percent (+/−5%) for the target voltage band $V_{Band-1}$. In this example, the target voltage band $V_{Band-1}$ will be from about 114V (i.e., 120V−(120V×0.050)) to about 126V (i.e., 120V+(120V×0.050)).

The voltage component $V_{Supply}(t)$ and electrical power $E_{Supply}(t)$ values measured at substation 530 may be retrieved from the DMS 480 (Step 620). The current, or most recent voltage component $V_{Meter}(t)$ and electrical power $E_{Meter}(t)$ values received and measured at the selected subset of the plurality of smart meters 330 may be retrieved from the MAS 460 (or a local storage, such as, for example, a computer readable medium, in the ROC 490) (Step 630). The current, or most recent voltage component $V_{Meter}(t)$ and electrical power $E_{Meter}(t)$ values may have been measured by the select subset of smart meters 330 and forwarded to the MAS 460 via the collector 350, as described above.

Alternatively, the current, or most recent voltage component $V_{Meter}(t)$ and electrical power $E_{Meter}(t)$ values may have been retrieved directly from the collector 350 or the selected subset of the smart meters 330 (Step 630).

The current, or most recent voltage component $V_{Meter}(t)$ and electrical power $E_{Meter}(t)$ values may have been measured at the selected subset of smart meters 330 in response to a smart meter data request signal received from the collector 350. The collector 350 may have sent the smart meter data request signal in response to a collector control signal received from the MAS 460 (or the ROC 490).

The current, or most recent voltage component $V_{Meter}(t)$ values may be averaged for the selected number of smart meters 330 to determine an average voltage component $V_{Meter-Avg}(t)$ value for the electrical power delivered to the selected smart meters 330. This average voltage component $V_{Meter-Avg}(t)$ value may then be compared to the target voltage band $V_{Band-n}$ to determine whether the average voltage component $V_{Meter-Avg}(t)$ value is within the target voltage band $V_{Band-n}$ (Step 650).

If the average voltage component $V_{Meter-Avg}(t)$ value is outside of the target voltage band $V_{Band-n}$, then a determination is made to change the set point voltage $V_{SP}$ of the voltage component $V_{Supply}(t)$ output by the substation 530 (YES at Step 660). Energy delivery parameters $C_{ED}$ may be generated and sent to the substation 530 to adjust the set point voltage $V_{SP}$ of the output voltage component $V_{Supply}(t)$ (Step 670). A new voltage set point voltage $V_{SP}$ value may be calculated by the DMS 480. Where a LTC transformer is used, the voltage set point voltage $V_{SP}$ value may be increased (or decreased) at a maximum rate of, for example, one volt about every, for example, fifteen minutes (Note: for example, a 0.625% voltage change per step in a LTC transformer). It is noted that the voltage set point voltage $V_{SP}$ value may be increased (or decreased) at a rate of, for example, a fraction of a volt, or multiple volts at one time. The energy delivery parameters $C_{ED}$ may include, for example, load tap coefficients. The set point voltage $V_{SP}$ may be adjusted up (or down) by, for example, a fraction of a Volt (e.g., 0.01V, 0.02V, . . . , 0.1V, 0.2V, . . . , 1.0V, . . . , or the like).

Furthermore, when either the $V_{Supply}(t)$ or the $V_{Meter-Avg}(t)$ voltage components reach or fall below a predetermined minimum voltage range (for example, about 118V to about 119V), the set point voltage $V_{SP}$ may be increased. When the voltage set point $V_{SP}$ is raised, the $V_{Supply}(t)$ or the $V_{Meter-Avg}(t)$ voltage components should remain in a higher voltage band for, e.g., twenty-four hours before the voltage set point $V_{SP}$ may be lowered again.

If the average voltage component $V_{Meter-Avg}(t)$ value is within the target voltage band $V_{Band-n}$, then a determination is made not to change the set point voltage $V_{SP}$ of the voltage component $V_{Supply}(t)$ output by the substation 530 (NO at Step 660), and a determination may be made whether to end the VCC process (Step 680). If a determination is made not to end the VCC process (NO at Step 680), the VCC process repeats.

According to an aspect of the disclosure, a computer readable medium is provided containing a computer program, which when executed on, for example, the ROC 495 (shown in FIG. 2), causes the VCC process according to FIG. 4 to be carried out. The computer program may be tangibly embodied in the computer readable medium, comprising a code segment or code section for each of the Steps 610 through 680.

Figure 5A:
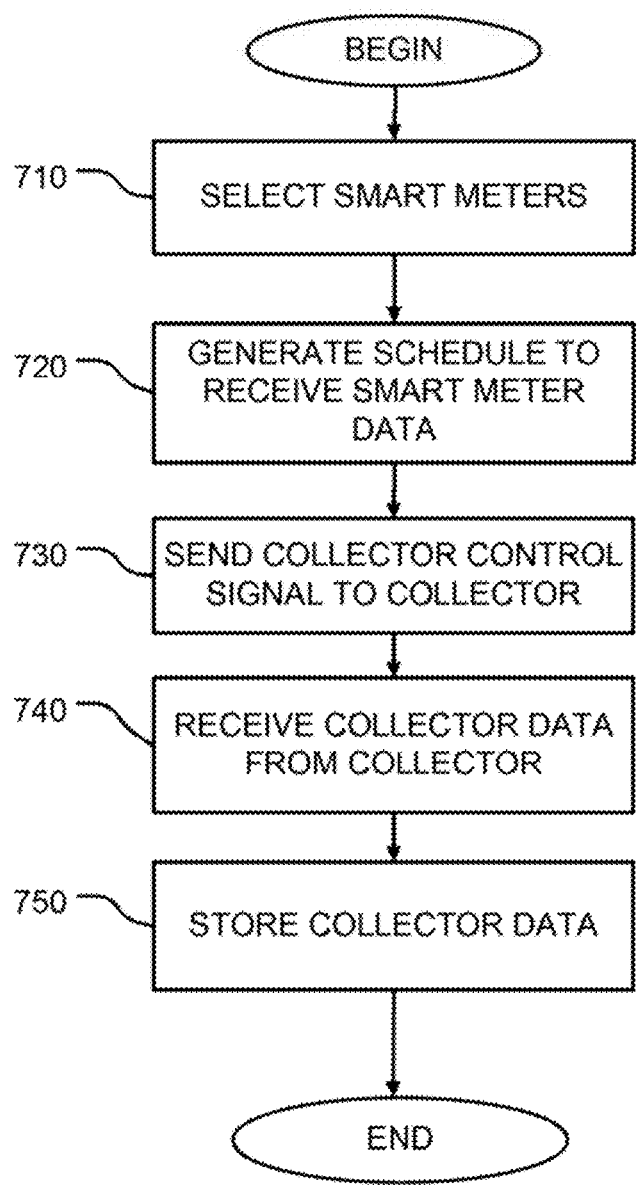
FIG. 5A shows an example of a process for monitoring the voltage component and electrical energy received and measured at selected smart meters, according to principles of the disclosure.

FIG. 5A shows an example of a process for monitoring the voltage component $V_{Meter}(t)$ and electrical power $E_{Meter}(t)$ received and measured at selected smart meters 330, according to an aspect of disclosure.

Referring to FIGS. 2 and 5A, initially a subset of smart meters 330 is selected from the smart meters 330 that are coupled to the power lines 340, which are supplied with the electrical energy $E_{Supply}(t)$ out from the substation 530 (Step 710). The subset may include, for example, one or more (or all) of the smart meters 330 that are selected randomly or based on predetermined criteria. The predetermined criteria may include, for example, historical smart meter data, weather conditions, geographic area, solar irradiation, historical energy usage associated with particular smart meters 330, and the like. The smart meters 330 may be selected, for example, at the ROC 490 or MAS 460.

A schedule may be generated to obtain smart meter data from the selected subset of smart meters 330 (Step 720). The schedule may include, for example, measuring the received voltage component $V_{Meter}(t)$ and electrical power $E_{Meter}(t)$ every, for example, five seconds, ten seconds, thirty seconds, one minute, five minutes, ten minutes, fifteen minutes, or the like, at the selected subset of smart meters 330. The generated schedule is provided to the collector 350 that is associated with the selected subset of smart meters 330 as part of a collector control signal (Step 730). The collector control signal may be generated at, for example, the ROC 490 or MAS 460 and sent to the collector 350 via communication link 410 and network 170.

The collector 350, based on the provided collector control signal or a previously received schedule, may send a smart meter data request signal to the selected subset of smart meters 330 via communication links 320. The smart meter data request signal may include, for example, the schedule provided in the collector control signal. The schedule may be stored at the selected subset of smart meters 330 and used by the smart meters 330 to control monitoring and reporting of the received voltage component $V_{Meter}(t)$ and electrical power $E_{Meter}(t)$ for the associated user 150 (160).

The collector 350 receives the reported smart meter data, including the voltage component $V_{Meter}(t)$ and electrical energy $E_{Meter}(t)$ for the associated user 150 (160), from the selected subset of smart meters 330 via communication links 320. The collector 350 compiles the received smart meter data, generating collector data and sending the collector data to the EC system 400.

The collector data is received from the collector 350 (Step 740) and stored locally (or remotely) in the EC system 400 (Step 750). In particular, the received collector data is stored locally in, for example, the ROC 490, the MAS 460 and/or the DB 470.

According to an aspect of the disclosure, a computer readable medium is provided containing a computer program, which when executed on, for example, the ROC 495 (shown in FIG. 2), causes the process for monitoring the voltage component and electrical power to be carried out according to FIG. 5A. The computer program may be tangibly embodied in the computer readable medium, comprising a code segment or code section for each of the Steps 710 through 750.

Figure 5B:
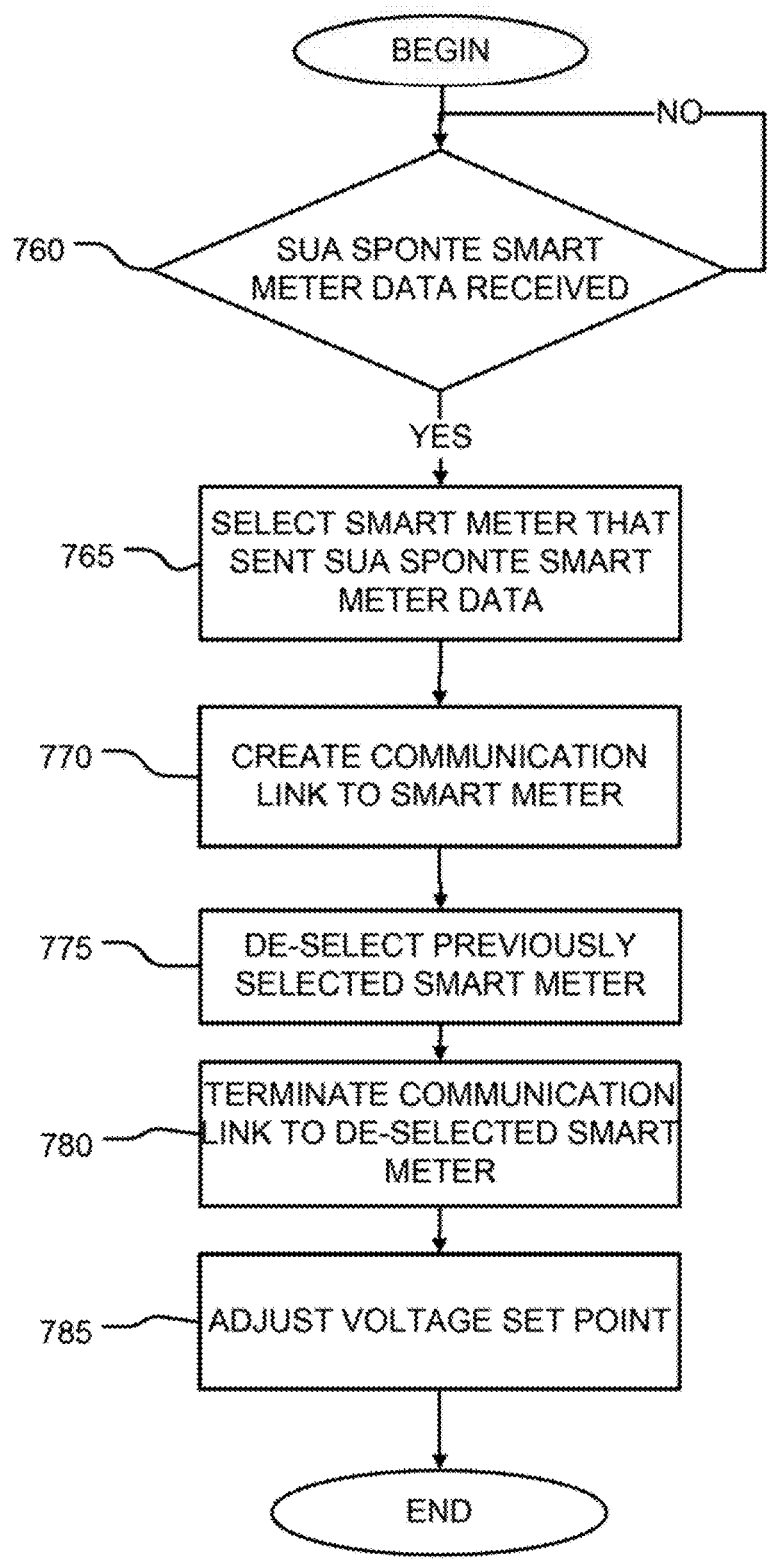
FIG. 5B shows an example of a process for selecting a smart meter operating in a report-by-exception mode and de-selecting a previously selected smart meter, according to principles of the disclosure.

FIG. 5B shows an example of a process for selecting a smart meter 330 operating in a report-by-exception mode and de-selecting a previously selected smart meter, according to principles of the disclosure.

Referring to FIG. 2 and FIG. 5B, the EC system 400 is configured to listen or monitor for sua sponte smart meter data that may be received from one or more of the smart meters 330 operating in the report-by-exception mode (Step 760). If sua sponte smart meter data is received from a particular smart meter 330 (YES, at Step 760), then the EC system 400 will proceed to select that particular smart meter 330 (Step 765) and create a communication link to the smart meter 330 (Step 770), otherwise the EC system 400 continues to monitor for sua sponte smart meter data (NO, at Step 760). The EC system 400 de-selects a previously selected smart meter 330 (Step 775), which was selected as part of the subset smart meters 330 to be monitored from the plurality of smart meters 330, and terminates the communication link to the de-selected smart meter 330 (Step 780). The EC system 400 may use the sua sponte smart meter data to determine a voltage set point and provide the voltage set point to the ER system 500 to adjust the voltage set point (Step 785).

According to an aspect of the disclosure, a computer readable medium is provided containing a computer program, which when executed on, for example, the ROC 495 (shown in FIG. 2), causes the process for selecting a smart meter 330 operating in a report-by-exception mode and de-selecting a previously selected smart meter. The computer program may be tangibly embodied in the computer readable medium, comprising a code segment or code section for each of the Steps 760 through 785.

Figure 6:
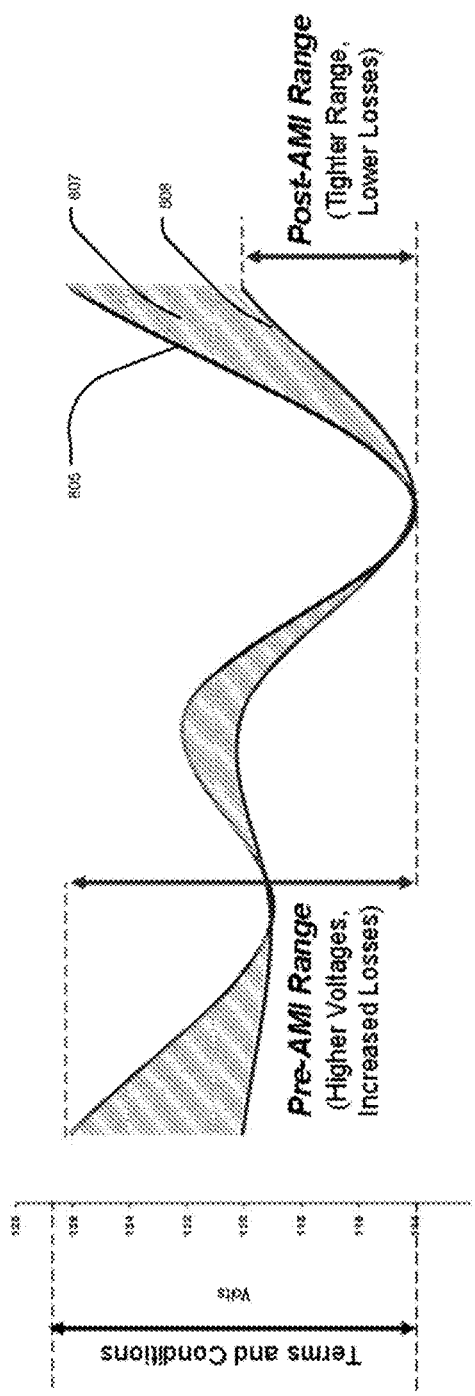
FIG. 6 shows an example of a graph of a voltage of electric power supplied to users versus a time of day, according to principles of the disclosure.

FIG. 6 shows an example of a graph of a voltage of electric power supplied to users 150, 160, versus a time of day, according to principles of the disclosure. In particular, the upper waveform 805 shows an example of voltage fluctuations in the electrical power delivered to the users 150, 160, without the VCC system 200. The lower waveform 808 shows an example of voltage fluctuations in the electric power delivered to users 150, 160, with the VCC system 200. The area 807 between the upper waveform 805 and lower waveform 808 corresponds to the energy saved using the VCC system 200.

As seen in FIG. 6, the lower waveform 808 includes a tighter range (lower losses) of voltage fluctuations compared to the upper waveform 805, which experiences higher voltage fluctuations and increased losses, resulting in substantially reduced power losses for the lower waveform 808. For example, the voltage 805 may fluctuate between about 114V and about 127V. Whereas, in the VCC system 200, the voltage waveform 808 fluctuation may be reduced to, for example, between about 114V and about 120V. As seen in the graph, the VCC system 200 may provide conservation through, for example, avoided energy imports and behind-the-meter savings. Further, the VCC system 200 may provide high confidence level of savings without having to depend on the actions of the users 150, 160.

Figure 3:
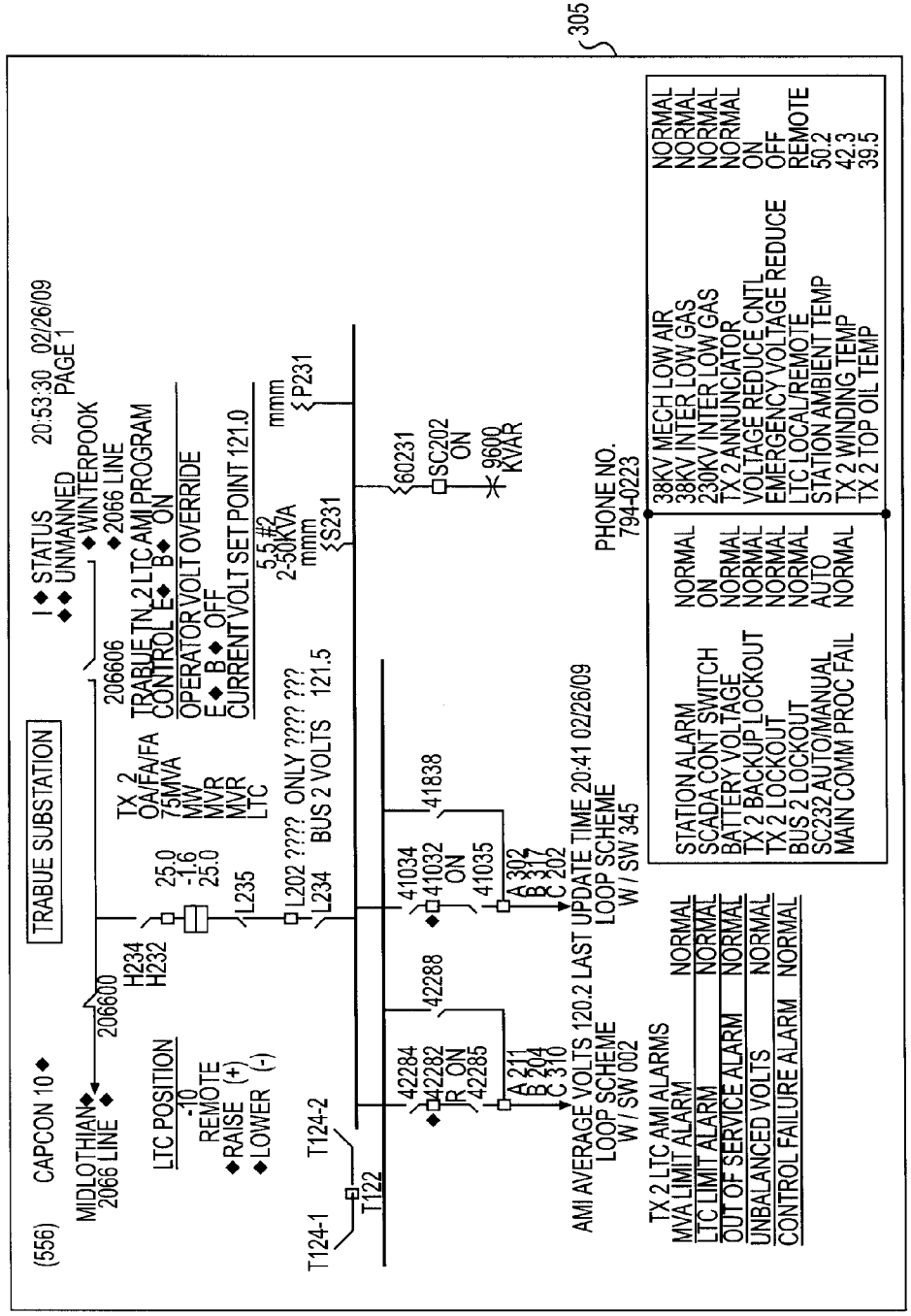
FIG. 3 shows an example of a control screen that may be displayed on a regional operation center (ROC) computer, according to principles of the disclosure.
Figure 7:
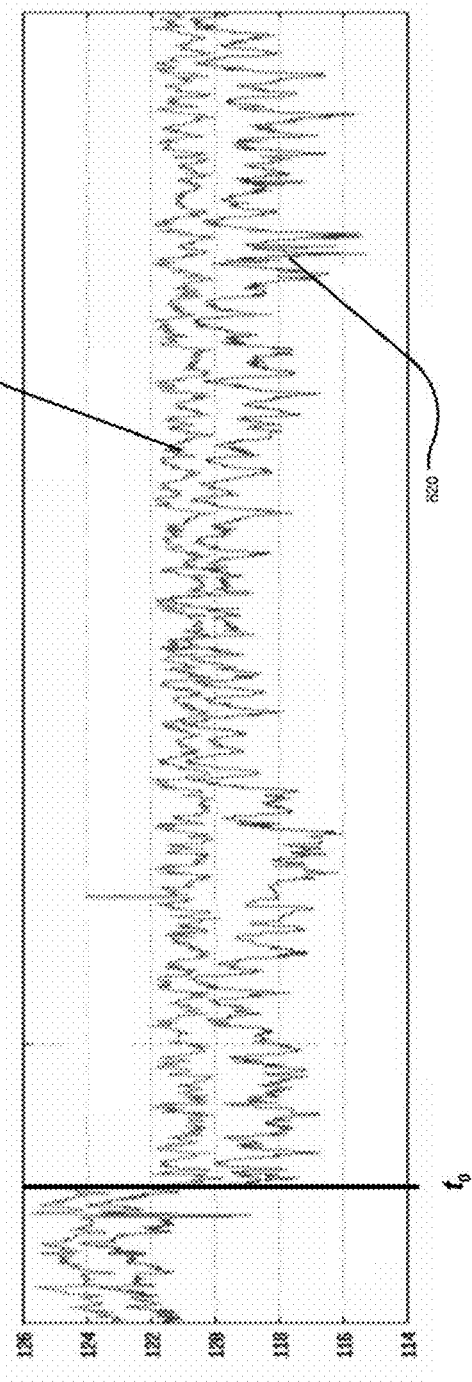
FIG. 7 shows an example of a graph of substation voltages of electric power produced by, for example, an LTC transformer at a substation, which may be associated with, for example, the information displayed on the control screen shown in FIG. 3.

FIG. 7 shows an example of a waveform 810 of substation voltages $V_{Supply}(t)$ of electric power produced by, for example, an LTC transformer at the substation 530, which may be associated with, for example, the information displayed on the control screen 305 shown in FIG. 3. A waveform 820 shows an average of, for example, twenty lowest level (or worst case) user voltages $V_{Meter}(t)$ (for example, the ten worst voltages on one distribution circuit averaged with the ten worst voltages on another distribution circuit) monitored at any one time on two distribution circuits that supply, for example, six-thousand-four-hundred users 150, 160 (shown in FIG. 1) with electrical power during a period of time. In particular, the graph 810 shows an example of voltage fluctuations (for example, an average of voltage 812 fluctuations and voltage 814 fluctuations on the pair of circuits, respectively) in the electrical power produced by the substation 530 (for example, the TRABUE SUBSTATION in FIG. 3) and the voltage 820 fluctuations (for example, on the pair of circuits) in the electrical power delivered to the users 150, 160.

The waveforms 810 and 820 prior to time $t_0$ show an example of voltage fluctuations in the electrical power $E_{Supply}(t)$ supplied by the substation 530 and electrical power $E_{Meter}(t)$ received by the users 150, 160, without the VCC system 200. The waveforms 810 and 820 after time $t_0$ show an example of voltage fluctuations in the electrical power $E_{Supply}(t)$ supplied by the substation 530 and electrical power $E_{Meter}(t)$ received by the users 150, 160, with the VCC system 200. As seen in FIG. 7, before voltage control was applied (i.e., before $t_0$), the voltages 812, 814 (with an average voltage signal 810) of the electrical power $E_{Supply}(t)$ supplied by the substation 530 generally fluctuated between, for example, about 123V and about 126V; and the voltage waveform 820 of the electrical power $E_{Meter}(t)$ received by the users 150, 160, generally fluctuated between, for example, about 121V and 124V. After voltage control was applied, the voltage waveforms 812, 814 (810) generally fluctuated between, for example, about 120V and about 122V, and the voltage waveform 820 generally fluctuated between, for example, about 116V and about 121V. Accordingly, the VCC system 200 is able to operate the users 150, 160, in a lower band level.

Energy savings 807 (shown in FIG. 6) that result from operation of the VCC system 200, according to principles of the disclosure, may be measured and/or validated by measuring the voltage component $V_{Supply}(t)$ and electrical power $E_{Supply}(t)$ levels of electric power supplied by the substation 530 relative to the corresponding reference voltage set point $V_{SP}(t)$ value. In the example shown in FIG. 7, the voltage $V_{Supply}(t)$ and electrical energy $E_{Supply}(t)$ levels may be measured at the transformer output (not shown) where the voltage control may be implemented. However, the measurement may be performed at any point where measurements could be made for the transmission or distribution systems.

Figure 8:
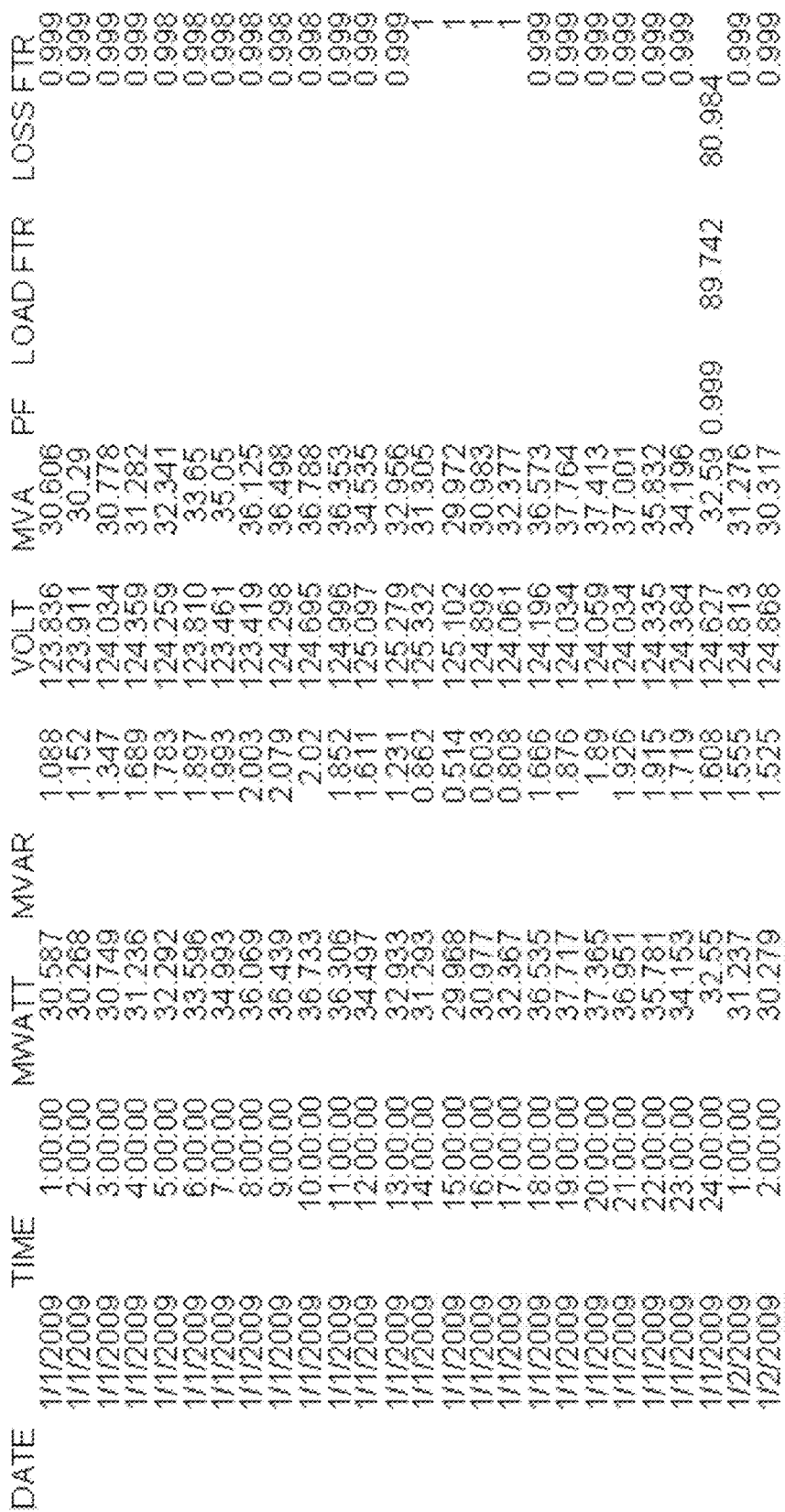
FIG. 8 shows an example of data collected (including voltage and energy measurement) hourly by the DMS in the example of FIG. 7, before application of the voltage control according to the principles of the disclosure.

FIG. 8 shows an example of data collected (including voltage and energy measurement) hourly by the DMS 480 (shown in FIG. 2), before time $t_0$ (shown in FIG. 7), when voltage control is not carried out in the VCC system 200. As seen in FIG. 8, the collected data may include, for example, a date, a time (hour:minute:second), a power level (MWatt), a reactive power level (MVAr), a voltage (V), an apparent power level (MVA), a power factor (PF), loss factor, and loss FTR, of the electrical power $E_{Supply}(t)$ output by the substation 530.

FIG. 9 shows an example of data collected (including voltage and energy measurement) hourly by the DMS 480 (shown in FIG. 2), after time $t_O$ (shown in FIG. 7), when voltage control is carried out in the VCC system 200. As seen in FIG. 9, the collected data may include, for example, a date, a time (hour:minute:second), a power level (MWatt), a reactive power level (MVAr), a voltage (V), an apparent power level (MVA), a power factor (PF), load financial transmission rights (FTR), and loss FTR, of the electrical power $E_{Supplied}(t)$ output by the substation 530 with voltage control carried out by the VCC system 200.

Comparing the data in FIG. 8 to data of FIG. 9, the voltage $V_{Supply}(t)$ and electrical power $E_{Supply}(t)$ measurements show the substantial impact of lowering voltage on the electric power usage by, for example, users 150, 160. In this regard, the hourly data at a transformer (not shown) in the substation 530 (shown in FIG. 2) may be saved hourly. Voltage control and/or conservation may be carried according to the principles of the disclosure, and the energy use before (FIG. 8) and after (FIG. 9) implementation of the VCC system 200 may be compared at the two different voltage levels along the distribution circuit (for example, from or in the substation 530). In the examples shown in FIGS. 8 and 9, the before voltages may range from, for example, about 123V to about 125V, and the after voltages may range from, for example, about 120V to about 122V.

As shown in FIG. 7, the VCC system 200 can monitor the twenty worst case voltages supplied by the distribution circuits and control the source bus voltage $V_{SP}(t)$ to maintain the operation in the lower band, as shown, for example, in FIG. 6. The VCC system 200 can also reselect the smart meters 330 used for the 20 worse case voltages based on, for example, the information received from the EC system 400 "report-by-exception" monitoring of voltage. The VCC system 200 may select these new smart meters 330 from the total number of smart meters 330 connected to the substation 530.

The voltage $V_{Supply}(t)$ and electrical power $E_{Supply}(t)$ data shown in FIGS. 8 and 9 may be arranged by hour and averaged over twenty-four hour periods, retaining the correct average of voltage to electrical power (MW) by calculating the voltage to electrical power (MW) value for each hour, adding for the twenty-four hours, calculating the weighted twenty-four hour voltage using the average hourly electrical power (MW) value and the total twenty-four hour electrical power (MW) to Voltage ratio for the day. This may produce one value for average electrical power (MW) per hour for a twenty-four hour period and a weighted voltage associated with this average electrical power usage.

Figure 10:
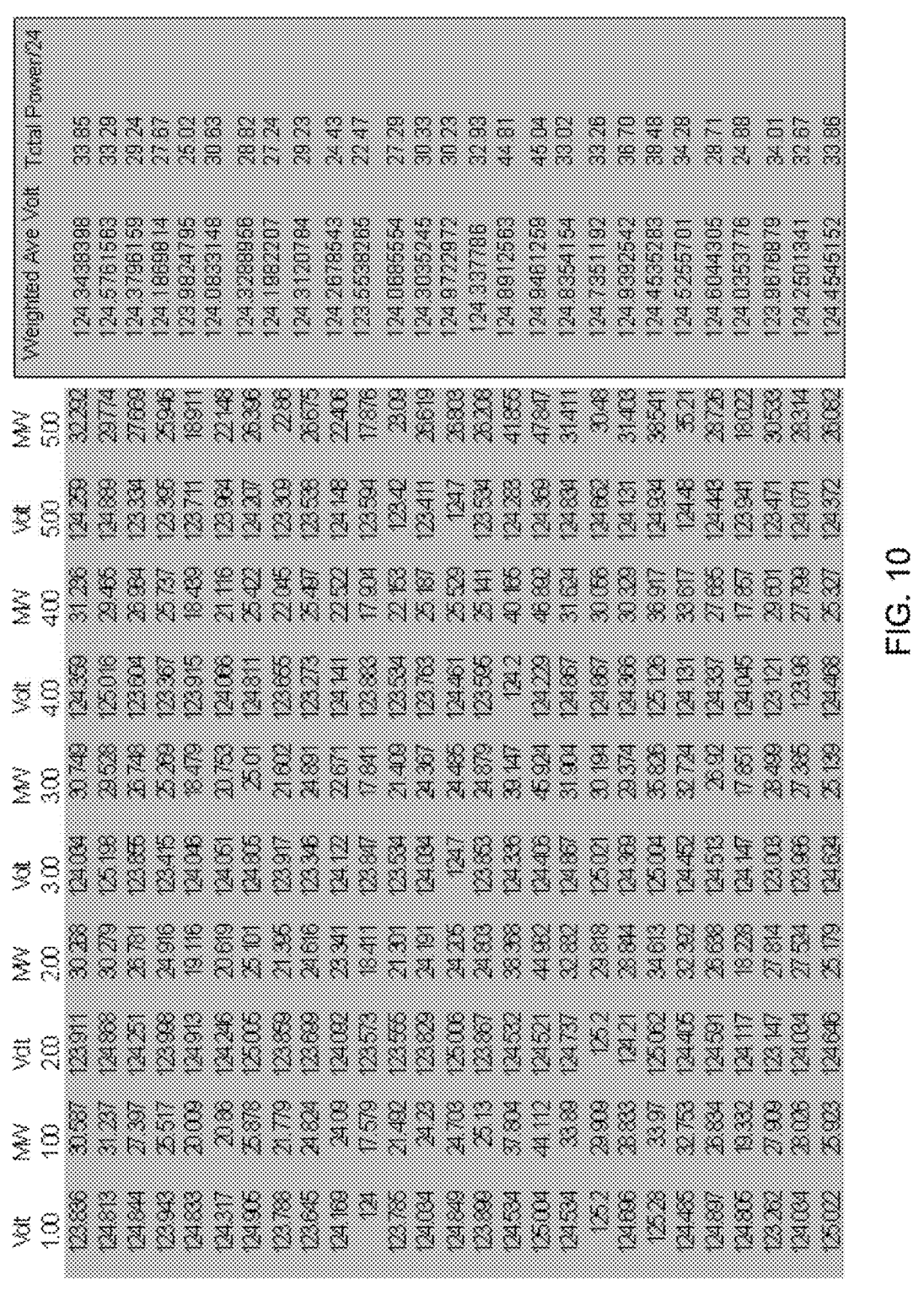

FIG. 10 shows an example of calculation data for hours 1-5 and the average for the full twenty-four hours in the example of FIGS. 7-9.

FIG. 11 shows an example where data may be collected for weather variables for the days before and after voltage control and/or conservation by the VCC system 200 according to the disclosure. In particular, FIG. 11 shows the data collected from the National Weather Service for, for example, Richmond International Airport, the nearest weather station location to the TRABUE SUBSTATION (shown in FIG. 3). The data shown is for the same period as the example of FIG. 7. The data shown in FIG. 11 may be used to eliminate as much of the changes in power, other than those caused by voltage, to provide as accurate a measurement as possible.

Figure 12:
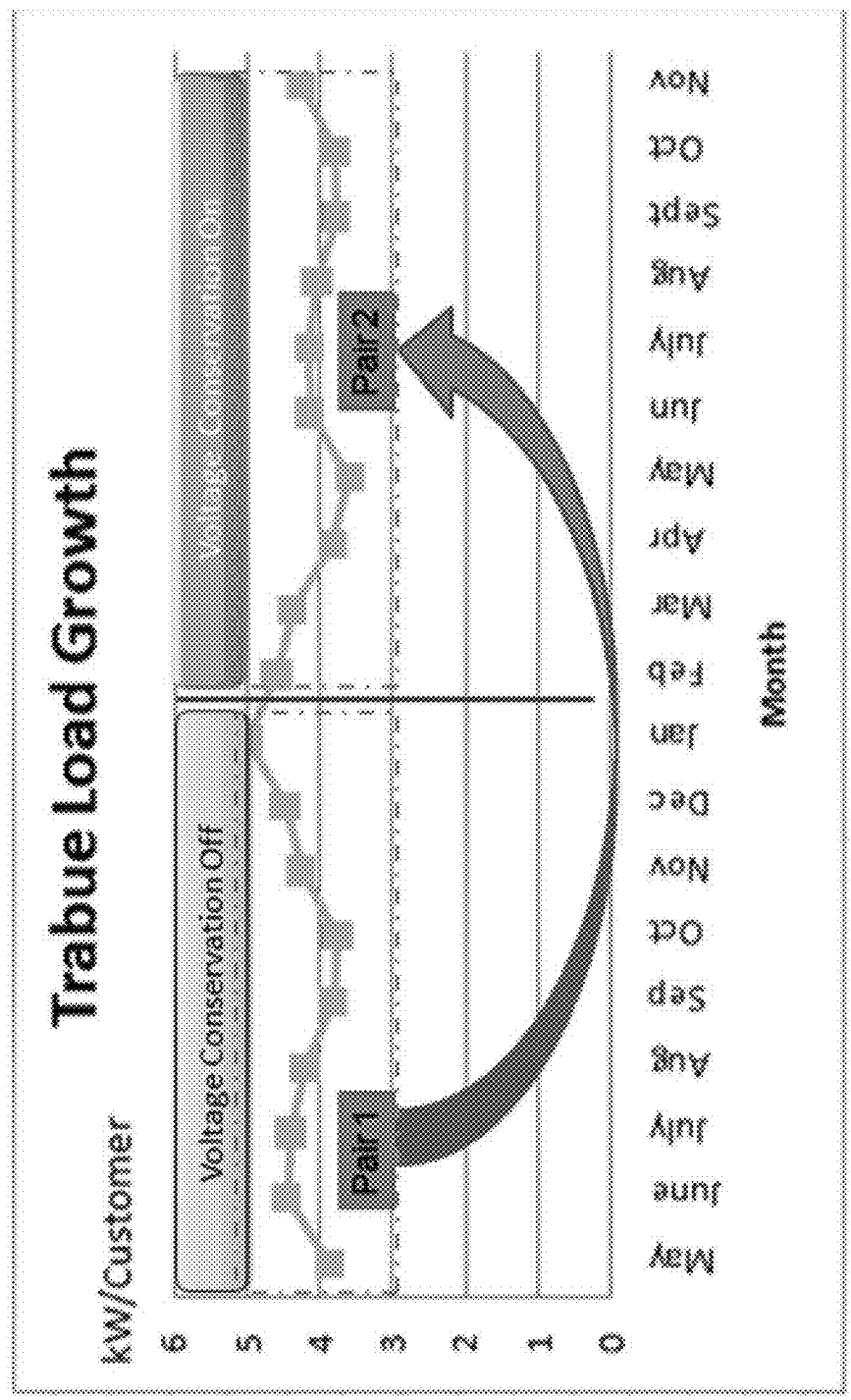
FIG. 12 shows an example of an application of a paired test analysis process, according to principles of the disclosure.

FIG. 12 shows an example of an application of the paired test analysis process, according to principles of the disclosure. As seen, kW usage per customer per day in the time period from May to January when, for example, the VCC is in the OFF mode, is compared to kW usage per customer per day in the time period from January to November when, for example, the VCC is the ON mode. The Trabue Load growth demonstrates the process of pairing the test days from state 1 to sate 2. Days from the pair 1 are picked from the May through January time period with voltage conservation turned OFF and matched with the days from the pair 2 period from, for example, January through November. The match may be based on the closest weather, season, day type, and relative humidity levels to remove as many other variables as possible, except for the change in voltage. Because the data is collected over a long period of time, where economic and growth can also impact the comparison of the characteristics of growth or economic decline are removed by using the kW-per-customer data to remove effects in customer energy usage increases and decreases and a monthly linear regression model to remove the growth or economic decline correlated to the month with the weather variables removed.

Figure 13:
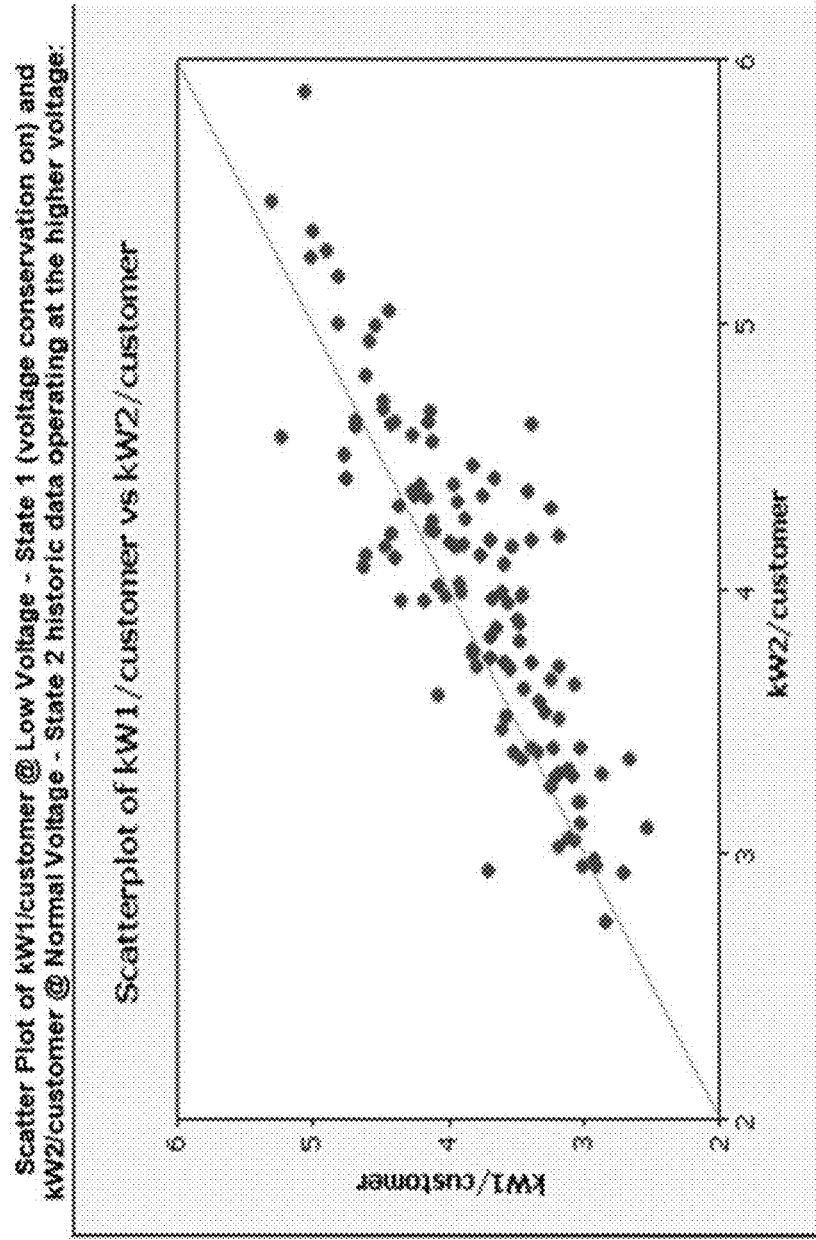
FIG. 13 shows an example of a scatterplot of kW-per-customer days with VCC ON to kW-per-customer days with VCC OFF.

FIG. 13 shows an example of a scatterplot of a total power per twenty-four hours versus heating degree day. In this regard, the voltage and electrical power (MW) per hour may be recorded, and average voltage and electrical power (MW) per hour determined for a twenty-four hour period. The scatterplot may be used to predict the power requirements for the next day using the closest power level day from the historical data stored in DB 470 (shown in FIG. 2). The calculation may use as inputs the change in the variables from the nearest load day to the day being calculated and the output may be the new load level. Using these inputs and a standard linear regression calculation a model may be built for the historical data. The regression calculation may include, for example, the following expression [2]:

$$E_{total/Customer} = -4.54 - 0.260 D_{Season} - 0.213 D_{Type} + 0.0579 H + 0.0691 V_{Avg} + 0.00524 D_{Month} \quad [2]$$

where: $E_{Total}$ is a total power for a twenty-four hour period per customer for a particular day; $D_{Type}$ is a day type (such as, for example, a weekend, a weekday, or a holiday) of the particular day; $D_{Season}$ is one of four seasons corresponding to the particular day in the calendar year; $D_{Month}$ is the particular day in the month; H is a Heating Degree Day level for the particular day; and V is the $V_{Avg}$ average voltage supplied per customer for the particular day.

The data shown in the example of FIG. 13 includes historic data for a 115 day period, before the VCC system 200 is implemented according to principles of the disclosure. The example shown in FIG. 12 may correspond to a winter season for TRABUE SUBSTATION loads. As seen in FIG. 13, the model may be used represent the change in power level from one day to the next that is not related to the weather, growth, and economic variables in the linear regression expression [2].

The historical data may be adjusted to match the heating degree day level for the measurements taken after the voltage control and/or conservation is carried out by the VCC system 200. For example, referring to FIG. 11, a heating degree day of 19 may be read for a particular day, Feb. 1, 2009. The historical data may be searched in the DB 470 for all days with heating degree levels of 19. For example, two days in December may be found with the same heating degree day levels—for example, December 1 and 17. The linear regression model expression [2] for the historical data may be used to adjust the variables for December 1 and 17 to the same values as the data taken on Feb. 1, 2009. This may provide as close a match between the historical (operating at the higher voltage level) and Feb. 1, 2009 (operating at the lower voltage level). The calculation of (change in MW)/(change in Voltage) may be made from the high voltage to the low voltage operation. This may become one data point for the statistical analysis.

Figure 14:
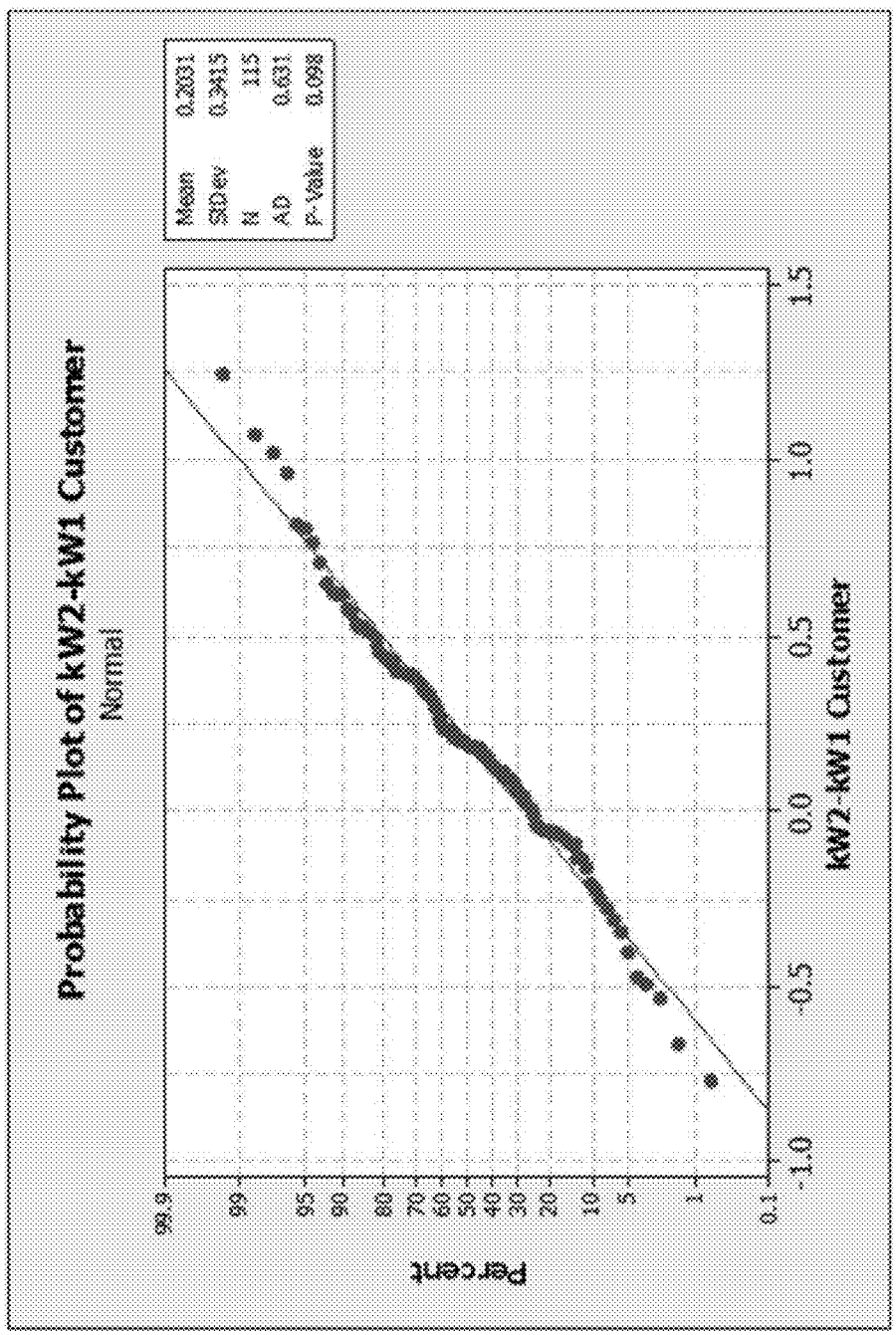
FIG. 14 shows an example of a summary chart for the data shown in FIG. 13, according to principles of the disclosure.

This process may be repeated for all measurements taken after the voltage conservation is turned on and compared to all similar days in the historical data taken for the matching season and other weather conditions. This may produce, for example, one-hundred-fifteen data points from, for example, 115 days of operation matched with all of the historical matching data. The resulting statistical analysis of this data is shown in FIGS. 13-14.

The normality of the data may be validated using the Anderson-Darling Normality test. In the case of the example of FIGS. 13 and 14, the P-Value may be 0.098, which may be well above the required value of 0.01, thereby demonstrating that the data may be normal with an approximately 99% confidence level, as shown in FIG. 14. This allows the application of a one sample T test to demonstrate the average of the mean value of the change in electrical power (MW) to change in voltage. The test may be performed to evaluate the statistical significance of the average value being above, for example, about 1.0. As shown in FIG. 14 the test may demonstrate an approximately 99% confidence level that the savings in power to reduction in voltage may be above about 1.0% per 1% of voltage change. Using this type of statistical method continuous tracking of the energy saving improvement can be accomplished and recorded in kW/customer saved per day or aggregated to total kW saved for the customers connected to the substation 530.

Figure 15:
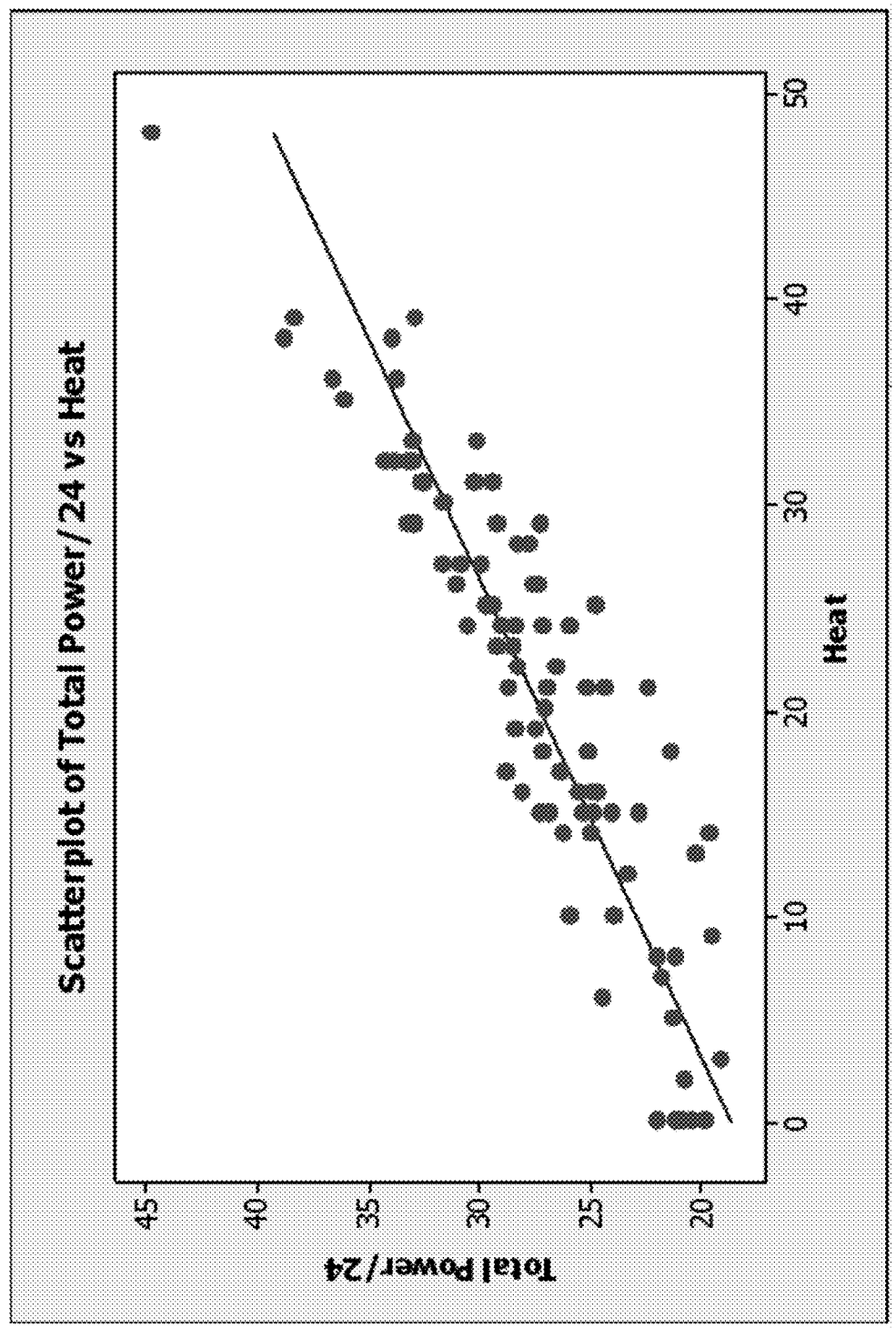
FIG. 15 shows an alternative example of a scatterplot of historical data before the VCC system is implemented, according to principles of the disclosure.
Figure 16:
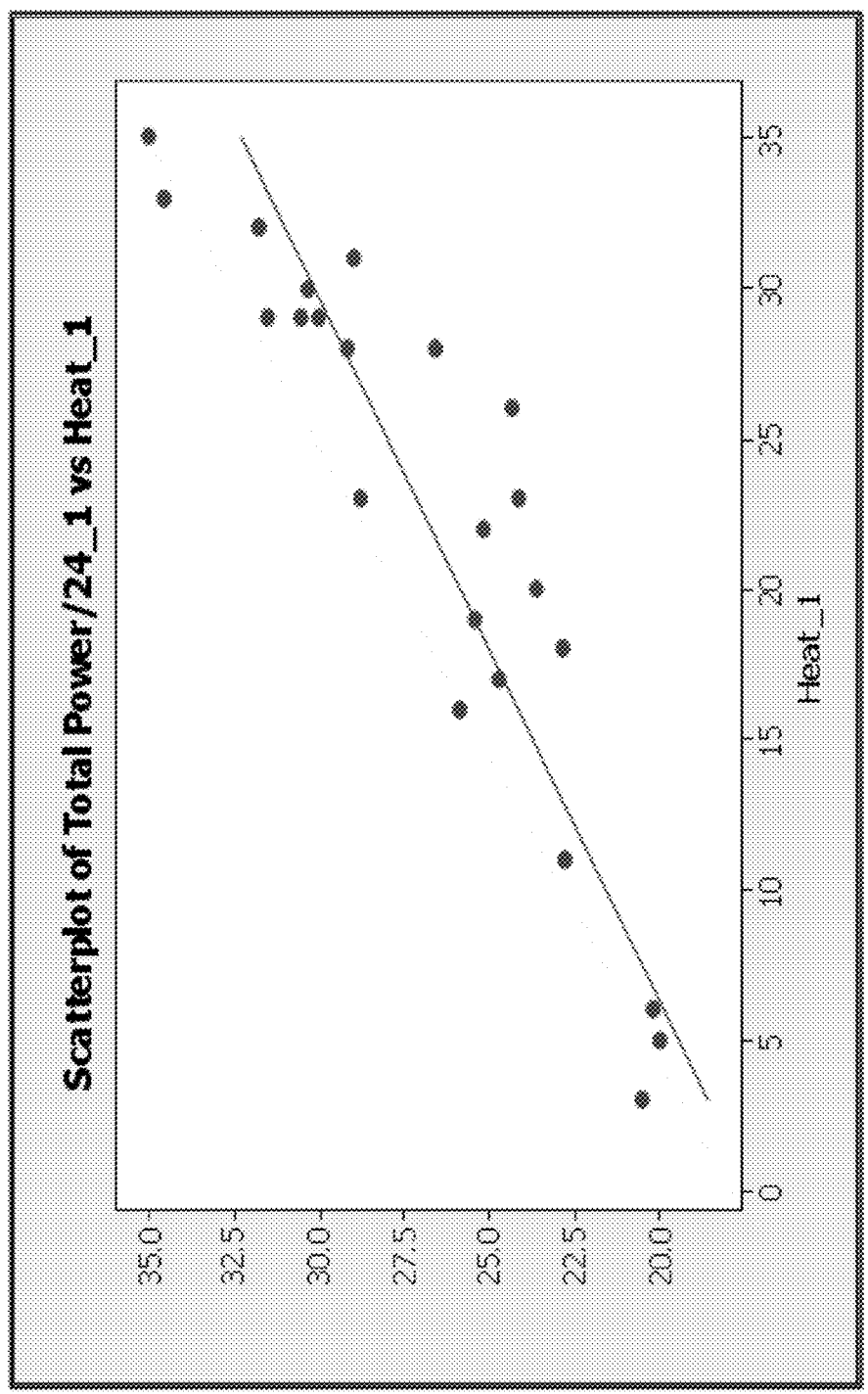
FIG. 16 shows an alternative example of a scatterplot of historical data after the VCC system is implemented, according to principles of the disclosure.

FIG. 15 shows an alternative example of a scatterplot of a total power per twenty-four hours versus heating degree day. In this regard, the voltage and electrical power (MW) per hour may be recorded, and average voltage and electrical power (MW) per hour determined for a twenty-four hour period. The scatterplot may be used to predict the power requirements for the next day using the closest power level day from the historical data stored in DB 470 (shown in FIG. 2). The calculation may use as inputs the change in the variables from the nearest load day to the day being calculated and the output may be the new load level. Using these inputs and a standard linear regression calculation a model may be built for the historical data. The regression calculation may include, for example, the following expression [3]:

$$E_{Total} = \quad [3]$$
$$(-801 + 0.069Y + 0.0722D_{Type} + 0.094D_{Year} + 0.0138D_{Month} + 0.126$$
$$T_{max} + 0.131T_{min} + 9.84T_{avg} + 10.1H - 10.3C + 0.251P_{Std.}) -$$
$$(0.102T_{max-d} - 0.101T_{min-d} + 0.892T_{avg-d} + 0.693H_d -$$
$$0.452C_d - 0.025P_R + 0.967E_{TotalPrevious})$$

where: $E_{Total}$ is a total power for a twenty-four hour period for a particular day; Y is a calendar year of the particular day; $D_{Type}$ is a day type (such as, for example, a weekend, a weekday, or a holiday) of the particular day; $D_{Year}$ is the particular day in the calendar year; $D_{Month}$ is the particular day in the month; $T_{max}$ is a maximum temperature for the particular day; $T_{min}$ is minimum temperature for the particular day; $T_{avg}$ is the average temperature for the particular day; H is a Heating Degree Day level for the particular day; C is a Cooling Degree Day level; $P_{Std.}$ is a barometric pressure for the particular day; $T_{max-d}$ is a maximum temperature for a closest comparison day to the particular day; $T_{min-d}$ is minimum temperature for the closest comparison day to the particular day; $T_{avg-d}$ is the average temperature for the closest comparison day to the particular day; $H_d$ is a Heating Degree Day level for the closest comparison day to the particular day; $C_d$ is a Cooling Degree Day level for the closest comparison day to the particular day; $P_R$ is a Barometric pressure for the closest comparison day to the particular day; and $E_{TotalPrevious}$ is the total average hourly usage in MW on the closest comparison day to the particular day. The data shown in the example of FIG. 15 includes historic data for a fifty day period, before the VCC system 200 is implemented according to principles of the disclosure. The example shown in FIG. 15 may correspond to a winter season for TRABUE SUBSTATION loads. As seen in FIG. 15, the model may represent 99.7% of the change in power level from one day to the next using the variables in the linear regression expression [3].

The historical data may be adjusted to match the heating degree day level for the measurements taken after the voltage control and/or conservation is carried out by the VCC system 200. For example, referring to FIG. 11, a heating degree day of 19 may be read for a particular day, Feb. 1, 2009. The historical data may be searched in the DB 470 for all days with heating degree levels of 19. For example, two days in December may be found with the same heating degree day levels—for example, December 1 and 17. The linear regression model expression [3] for the historical data may be used to adjust the variables for December 1 and 17 to the same values as the data taken on Feb. 1, 2009. This may provide as close a match between the historical (operating at the higher voltage level) and Feb. 1, 2009 (operating at the lower voltage level). The calculation of (change in MW)/(change in Voltage) may be made from the high voltage to the low voltage operation. This may become one data point for the statistical analysis.

Figure 17:
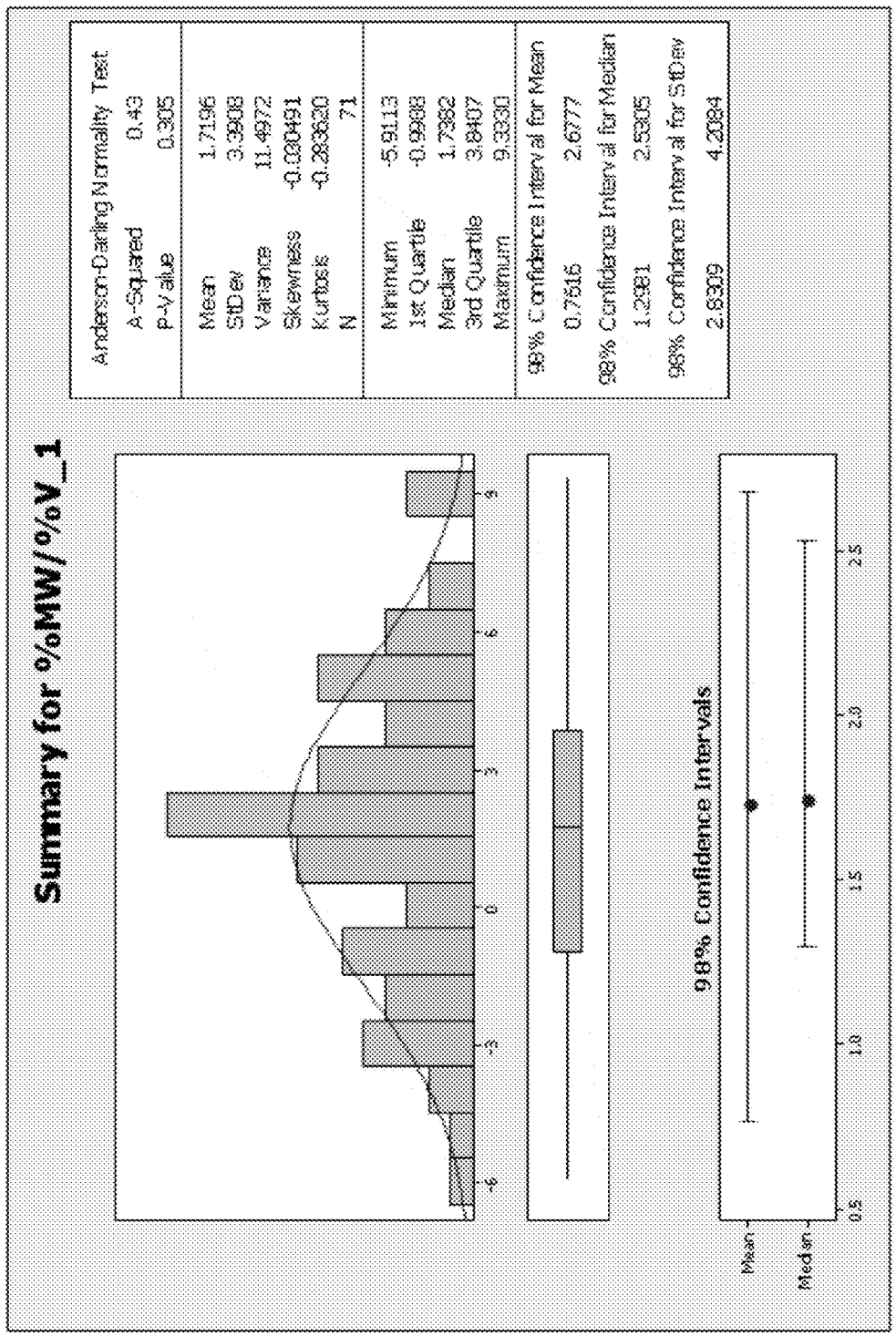
FIG. 17 shows an alternative example of a summary chart, including 98% confidence intervals, according to principles of the disclosure.

This process may be repeated for all measurements taken after the voltage conservation is turned on and compared to all similar days in the historical data taken for the matching season and other weather conditions. This may produce, for example, seventy-one data points from, for example, thirty days of operation matched with all of the historical matching data. The resulting statistical analysis of this data is shown in FIG. 17.

The normality of the data may be validated using the Anderson-Darling Normality test. In the case of the example of FIGS. 6 and 7, the P-Value may be 0.305, which may be well above the required value of 0.02, thereby demonstrating that the data may be normal with an approximately 98% confidence level, as shown in FIG. 17. This allows the application of a one sample T test to demonstrate the average of the mean value of the change in electrical power (MW) to change in voltage. The test may be performed to evaluate the statistical significance of the average value being above about 0.8. As shown in FIG. 17 the test may demonstrate an approximately 98% confidence level that the savings in power to reduction in voltage may be above about 0.8% per 1% of voltage change.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed:

1. A voltage control and energy conservation system for an electric power transmission and distribution grid configured to supply electric power to a plurality of user locations, the system comprising:

a substation including a supply point configured to supply electrical power to a plurality of user locations;

a plurality of sensors, wherein each sensor is located at a respective one of a plurality of distribution locations on the distribution grid at or between the supply point and at least one of the plurality of user locations, and wherein each sensor is configured to sense a voltage of the supplied electric power at the respective distribution location and to generate measurement data based on the sensed voltage;

a voltage controller configured to receive measurement data from each sensor of a subset of the plurality of sensors, wherein the subset includes more than one and substantially fewer than all of the plurality of sensors, and to generate an energy delivery parameter based on a comparison of the measurement data received from the subset to a controller target voltage band;

a voltage adjusting device configured to adjust a voltage of the electric power supplied at the supply point based on the energy delivery parameter;

wherein the energy delivery parameter is generated such that the voltage at each user location remains within a user target voltage band, the user target voltage band being a lower band of a safe nominal operating range;

wherein at least one other sensor of the plurality of sensors that is not included in the subset is further configured to send a respective reporting signal to the voltage controller when the voltage sensed by the sensor is determined to be outside of a respective sensor target voltage band; and wherein the voltage controller is further configured to add to the subset the at least one other sensor in response to receiving the reporting signal indicating that the voltage sensed by the at least one other sensor is outside of the respective sensor target voltage band.

2. The system of claim 1, wherein the subset of sensors comprises the sensors of the plurality of sensors that have the lowest sensed voltages.

3. The system of claim 1, wherein the voltage adjusting device comprises:
   a load tap change transformer that adjusts the voltage of the electric power supplied at the supply point based on a load tap change coefficient; or
   a voltage regulator that adjusts the voltage of the electric power supplied at the supply point based on the energy delivery parameter.

4. The system of claim 1, wherein the voltage controller is further configured to determine an average voltage by averaging the measurement data received from the subset, and generate the energy delivery parameter based on the determined average voltage.

5. The system of claim 4, wherein the voltage controller is further configured to adjust the energy delivery parameter when one of the voltage at a user location or the determined average voltage is below a predetermined minimum voltage value, the predetermined minimum voltage value being based on the safe nominal operating range.

6. The system of claim 1, wherein the voltage controller is configured to:
   store historical component data that includes at least one of aggregated energy component data at a substation level, voltage component data at a substation level, and weather data;
   determine energy usage at each of the plurality of sensors;
   compare the historical component data to the determined energy usage; and
   determine energy savings attributable to the system based on the results of the comparison of the historical component data to the determined energy usage.

7. The system of claim 1, wherein the safe nominal operating range is between about 114V and about 126V and the user target voltage band is between about 114V and about 120V.

8. The system of claim 1, wherein the safe nominal operating range is between about 114V and about 126V and the user target voltage band is between about 116V and about 121V.

9. The system of claim 1, wherein the safe nominal operating range is between about 111V and about 129V the user target voltage band is between about 111V and about 120V.

10. The system of claim 1, wherein each sensor of the subset is located at a respective one of the plurality of user locations.

11. The system of claim 1, wherein at least one of the plurality of sensors is located on the distribution grid between the supply point and at least one of the user locations.

12. The system of claim 1, wherein the supply point is at a transformer at the substation.

13. The system of claim 1, wherein the plurality of sensors comprises a plurality of smart meters.

14. The system of claim 1, wherein the at least one sensor target voltage band comprises a plurality of sensor target voltage bands, each of the plurality of sensor target voltage bands corresponding to a respective sensor.

15. The system of claim 1, wherein the subset includes about twenty sensors on the distribution grid.

16. The system of claim 1, wherein the subset includes about ten sensors on a distribution circuit of the distribution grid.

17. The system of claim 16, wherein the distribution grid comprises two distribution circuits providing electric power to about 6400 user locations.

18. A method for controlling electrical power supplied to a plurality of distribution locations located at or between a supply point and at least one user location, each of the plurality of distribution locations including at least one sensor configured to sense a voltage of the supplied electric power at the respective distribution location and generate measurement data based on the sensed voltage, the method comprising:
   receiving measurement data from a subset of the plurality of sensors, wherein the subset includes more than one but substantially fewer than all of the plurality of sensors; and
   adjusting a voltage at the supply point based on a comparison of the measurement data received from the subset to at least one controller target voltage band, wherein voltage at the supply point is adjusted such that a voltage at each user location remains within a user target voltage band, the user target voltage band being a lower band of a safe nominal operating range;
   receiving a reporting signal indicating that a voltage that is sensed by another sensor that is not part of the subset is outside of a respective sensor target component band; and
   in response to receiving the reporting signal indicating that the voltage sensed by the another sensor is outside of the respective sensor target component band, adding the another sensor to the subset.

19. The method of claim 18, wherein the subset of sensors comprises the sensors of the plurality of sensors that have the lowest sensed voltages.

20. The method of claim 18, wherein the act of adjusting a voltage at the supply point further comprises determining an average voltage by averaging the data received from the subset and adjusting the voltage at the supply point based on the determined average voltage.

21. The method of claim 20, wherein the act of adjusting a voltage at the supply point further comprises adjusting the voltage at the supply point when one of the voltage at a user location or the determined average voltage is below a predetermined minimum voltage value, the predetermined minimum voltage value being based on the safe nominal operating range.

22. The method of claim 18, wherein the safe nominal operating range is between about 114V and about 126V and the user target voltage band is between about 114V and about 120V.

23. The method of claim 18, wherein the safe nominal operating range is between about 114V and about 126V and the user target voltage band is between about 116V and about 121V.

24. The method of claim 18, wherein the safe nominal operating range is between about 111V and about 129V the user target voltage band is between about 111V and about 120V.

25. A controller for an energy conservation system for an electric power transmission and distribution grid configured to supply electric power from a supply point to a plurality of user locations, the controller comprising:
 at least one processor configured to:
  receive measurement data that is based on a measured component of electric power from each sensor of a subset of a plurality of sensors, wherein the plurality of sensors are located at respective distribution locations on the distribution grid at or between the supply point and at least one of the plurality of user locations, and wherein the subset includes more than one and substantially fewer than all of the plurality of sensors;
  generate an energy delivery parameter based on a comparison of a controller target band to the measurement data received from the sensors in the subset wherein the energy delivery parameter is generated such that a voltage at each user location remains within a user target voltage band, the user target voltage band being a lower band of a safe nominal operating range; and
  provide the energy delivery parameter to an adjusting device configured to adjust the electric power supplied at the supply point based on the energy delivery parameter; and
 wherein the controller is configured to receive a signal indicating that the measured component of electric power sensed by at least one other sensor of the plurality of sensors is outside of a sensor target component band, and
 wherein the controller is further configured to add to the subset the at least one other sensor in response to receiving the signal indicating that the measured component of electric power sensed by the at least one other sensor is outside of the sensor target component band.

26. The controller of claim 25, wherein the subset of sensors comprises the sensors of the plurality of sensors that have the lowest sensed measured component of electric power.

27. The controller of claim 25, wherein the controller is further configured to de-select at least one of the sensors in the subset when adding the at least one other sensor to the subset.

28. The controller of claim 27, wherein the controller is configured to maintain a set number of sensors in the subset.

29. The controller of claim 28, wherein the set number of sensors is approximately twenty.

30. The controller of claim 25, wherein the safe nominal operating range is between about 114V and about 126V and the user target voltage band is between about 114V and about 120V.

31. The controller of claim 25, wherein the safe nominal operating range is between about 114V and about 126V and the user target voltage band is between about 116V and about 121V.

32. The controller of claim 25, wherein the safe nominal operating range is between about 111V and about 129V the user target voltage band is between about 111V and about 120V.

33. The system of claim 1, wherein the voltage controller is further configured to de-select at least one of the sensors in the subset when adding the at least one other sensor to the subset.

34. The method of claim 18, further comprising de-selecting at least one of the sensors in the subset when adding the another other sensor to the subset.

\* \* \* \* \*